(12) United States Patent
Suzuki et al.

(10) Patent No.: US 8,024,099 B2
(45) Date of Patent: Sep. 20, 2011

(54) DECELERATION CONTROLLER FOR VEHICLE

(75) Inventors: Tatsuya Suzuki, Yokohama (JP); Shinji Matsumoto, Yokohama (JP); Masahide Nakamura, Yokohama (JP); Tomohiro Jimbo, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1315 days.

(21) Appl. No.: 11/591,348

(22) Filed: Nov. 1, 2006

(65) Prior Publication Data
US 2007/0106445 A1 May 10, 2007

(30) Foreign Application Priority Data
Nov. 7, 2005 (JP) ................. 2005-322307

(51) Int. Cl.
*G06F 19/00* (2011.01)
(52) U.S. Cl. ............ 701/70; 701/1; 701/72; 701/79; 701/93; 701/96; 303/140; 303/155; 303/160; 303/171; 340/425.5; 340/438; 340/441
(58) Field of Classification Search ............ 701/70
See application file for complete search history.

(56) References Cited

U.S. PATENT DOCUMENTS

| | | | |
|---|---|---|---|
| 5,742,507 A * | 4/1998 | Eckert | 701/70 |
| 6,062,659 A * | 5/2000 | Matsuda | 303/160 |
| 6,208,927 B1 * | 3/2001 | Mine et al. | 701/70 |
| 6,216,079 B1 * | 4/2001 | Matsuda | 701/70 |
| 6,385,528 B1 * | 5/2002 | Takahashi | 701/93 |
| 6,401,023 B1 * | 6/2002 | Takahashi | 701/70 |
| 6,409,287 B1 * | 6/2002 | Leach et al. | 303/146 |
| 6,442,469 B1 * | 8/2002 | Matsuno | 701/70 |
| 6,597,980 B2 * | 7/2003 | Kogure | 701/80 |
| 6,725,145 B1 * | 4/2004 | Takahashi | 701/70 |
| 6,778,896 B1 * | 8/2004 | Matsuura et al. | 701/70 |
| 7,337,055 B2 * | 2/2008 | Matsumoto et al. | 701/93 |
| 7,469,178 B2 * | 12/2008 | Shiiba et al. | 701/70 |
| 7,765,048 B2 * | 7/2010 | Suzuki et al. | 701/70 |
| 2002/0052681 A1 * | 5/2002 | Matsuno | 701/70 |
| 2005/0187694 A1 * | 8/2005 | Shiiba et al. | 701/70 |
| 2005/0216162 A1 * | 9/2005 | Suzuki et al. | 701/70 |
| 2005/0240334 A1 * | 10/2005 | Matsumoto et al. | 701/93 |
| 2006/0106522 A1 * | 5/2006 | Obradovich | 701/96 |
| 2006/0190158 A1 * | 8/2006 | Shiiba et al. | 701/70 |
| 2007/0208485 A1 * | 9/2007 | Yamamura et al. | 701/93 |

FOREIGN PATENT DOCUMENTS

| | | |
|---|---|---|
| JP | 8-194886 | 7/1996 |
| JP | 9-050597 A | 2/1997 |
| JP | 10-269499 | 10/1998 |
| JP | 10-278762 | 10/1998 |
| JP | 2001-84499 | 3/2001 |
| JP | 2001-088579 A | 4/2001 |
| JP | 2002-120711 | 4/2002 |
| JP | 2002-316600 A | 10/2002 |

(Continued)

*Primary Examiner* — Khoi Tran
*Assistant Examiner* — Jonathan L Sample
(74) *Attorney, Agent, or Firm* — Young Basile

(57) ABSTRACT

A deceleration control apparatus and method for controlling deceleration of a vehicle where a controller is operable to set a target vehicular speed calculated based on a turning condition of the vehicle and a lateral acceleration limitation value. The controller is also operable to apply deceleration to the vehicle based on the actual vehicular speed and the target vehicular speed and to correct the deceleration used when the vehicle is traveling along a detected curve. Correcting the deceleration can be done by, for example, correcting the lateral acceleration limitation value.

15 Claims, 19 Drawing Sheets

FOREIGN PATENT DOCUMENTS

| | | |
|---|---|---|
| JP | 2003-523865 | 8/2003 |
| JP | 2003-252188 | 9/2003 |
| JP | 2004-355266 A | 12/2004 |
| JP | 2005-081999 A | 3/2005 |
| JP | 2005-135178 A | 5/2005 |
| JP | 2005-170152 A | 6/2005 |
| JP | 2005-170328 A | 6/2005 |
| JP | 2005-306285 | 11/2005 |

* cited by examiner

DECELERATION CONTROLLER FOR VEHICLE

CROSS-REFERENCES TO RELATED APPLICATIONS

This application claims priority from Japanese Patent Application Serial No. 2005-322307, filed Nov. 7, 2005, which is incorporated herein in its entirety by reference.

TECHNICAL FIELD

The present invention pertains to a deceleration controller for a vehicle, which controller is used for deceleration control of a vehicle when making a curve, for example.

BACKGROUND

There are known deceleration controllers for vehicles. For example, in Japanese Kokai Patent Application No. Hei 10[1998]-278762, a safe vehicular speed for making a curve is computed based on a given turning condition of the vehicle and an allowable level of lateral acceleration preset according to a road-surface friction coefficient. The speed is automatically reduced to a safe vehicular speed, or lower, by an automatic braking system if the vehicle is about to exceed the safe vehicular speed in order to prevent spinning, drifting and overturning.

SUMMARY

In one vehicle deceleration control apparatus taught herein, the apparatus comprises a speed sensor for detecting an actual vehicular speed and a controller. The controller is operable to set a target vehicular speed calculated based on a given turning condition of the vehicle and a lateral acceleration limitation value. The controller is also operable to apply deceleration to the vehicle based on the actual vehicular speed and the target vehicular speed and to correct the deceleration of the vehicle based on information of a curve in a path of the vehicle.

In another example of an apparatus taught herein, the apparatus comprises means for detecting an actual vehicular speed, means for setting a target vehicular speed calculated based on a turning condition of the vehicle and a lateral acceleration limitation value, means for applying deceleration to the vehicle based on the actual vehicular speed and the target vehicular speed and means for correcting the deceleration of the vehicle based on information of a curve in a path of the vehicle.

Methods of controlling deceleration of a vehicle are also taught herein. For example, one method for controlling deceleration of a vehicle comprises detecting a road shape in a path of the vehicle, applying deceleration control to the vehicle when a turning speed of the vehicle is greater than a target vehicular speed and correcting the deceleration control when the road shape is a curve.

BRIEF DESCRIPTION OF DRAWINGS

The description herein makes reference to the accompanying drawings wherein like reference numerals refer to like parts throughout the several views, and wherein.

DETAILED DESCRIPTION

For known devices and methods for controlling deceleration of vehicles such as that described in Japanese Kokai Patent Application No. Hei 10[1998]-278762 mentioned above, since the allowable level of lateral acceleration as the threshold value for applying deceleration control is preset, the deceleration control may be applied for conditions other than traveling along a curve, such as when changing lanes. This can cause a sense of discomfort in the driver if the deceleration control is applied unnecessarily during travel other than along a curve.

According to embodiments of the invention, a target vehicular speed is set based on a given turning condition of the vehicle and a preset lateral acceleration limitation value. Deceleration control is performed based on the target vehicular speed and the current vehicular speed. The vehicle deceleration control apparatus detects information on the curve along which the vehicle travels and makes a correction to reduce the lateral acceleration limitation value based on the curve information. A correction is made to reduce the lateral acceleration limitation value when traveling along a curve, so that deceleration control can be applied more easily when traveling along a curve than when traveling straight ahead, and deceleration control suitable for a given road shape can be realized. As a result, the deceleration control apparatus can perform deceleration control appropriate for a given road shape.

Figure 1:
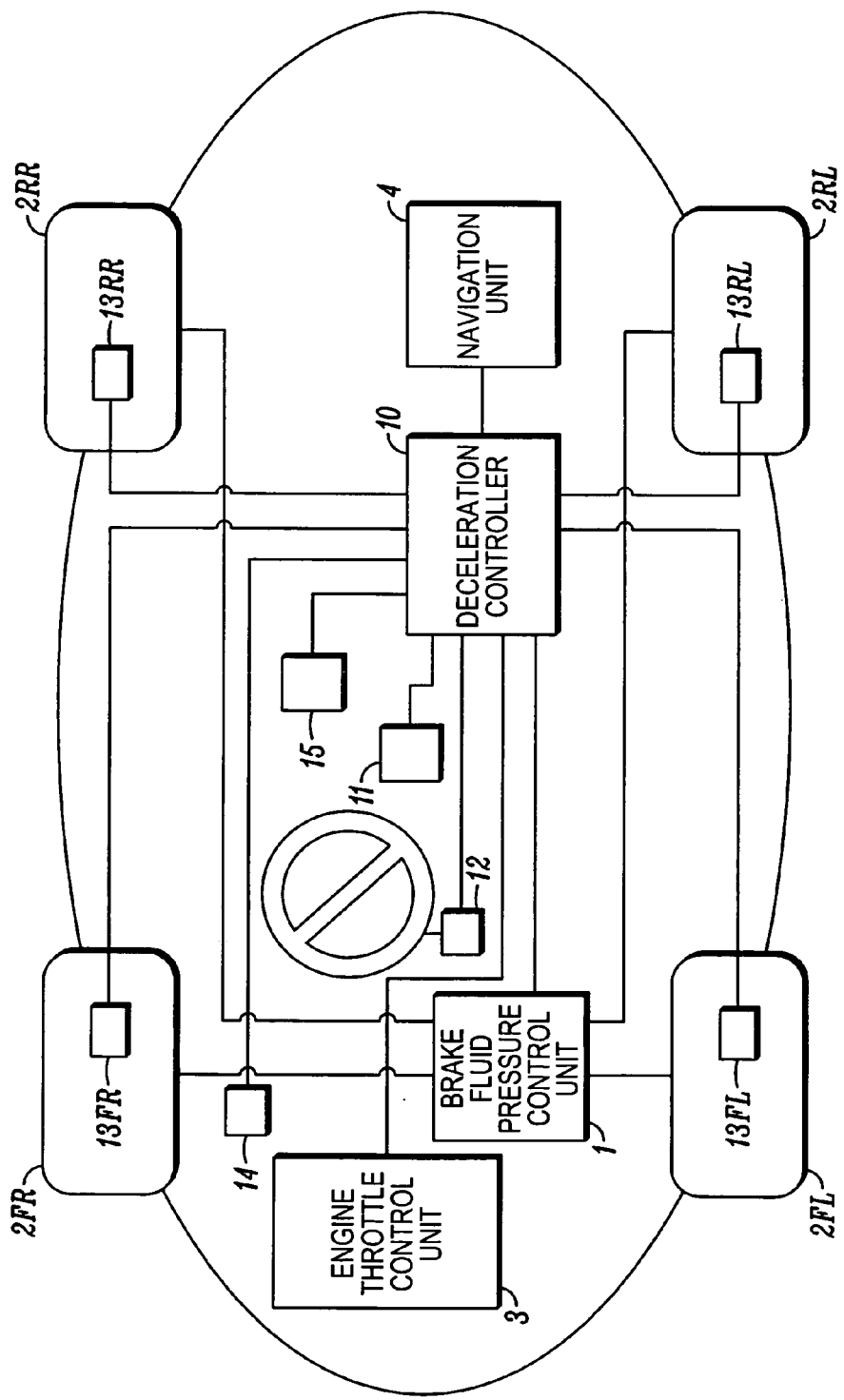
FIG. 1 is a diagram illustrating a deceleration control apparatus for a vehicle in accordance with an embodiment of the invention.

Details of embodiments are shown with reference to the drawing figures. FIG. 1 is a diagram illustrating an embodiment of a vehicle deceleration control apparatus being applied to an outline configuration of a vehicle. A brake fluid pressure control unit 1 is configured to control brake fluid supplied to respective wheel cylinders, not shown, for respective wheels 2FL, 2FR, 2RL, and 2RR. That is, brake fluid boosted by a master cylinder is supplied to respective wheel cylinders according to the degree of pressing of a brake pedal by a driver. The pressure of the brake fluid supplied to the respective wheel cylinders is controlled by brake fluid pressure control unit 1, which is provided between the master cylinder and the respective wheel cylinders, independently of an operation imparted to the brake pedal.

The brake fluid pressure control unit 1 utilizes a brake fluid pressure control circuit for antiskid control and traction control. The brake fluid pressure control unit 1 controls the brake fluid pressure in the respective wheel cylinders according to the value of a brake fluid pressure instruction value from a deceleration controller 10 to be described hereafter.

The vehicle is provided with engine throttle control unit 3 capable of controlling the throttle opening of a throttle valve (not shown). The engine throttle control unit 3 is configured in such a manner that while it is capable of controlling the throttle opening angle by itself, when a throttle opening command value is input from the deceleration controller 10 the engine throttle control unit 3 controls the throttle opening angle according to the throttle opening command value.

The vehicle is provided with navigation unit 4, which obtains information regarding the road shape ahead of the vehicle. The navigation unit 4 outputs the information obtained regarding the road shape ahead of the vehicle to deceleration controller 10.

A yaw rate sensor 11 detects a yaw rate $\phi'$ (referred to as measured yaw rate $\phi'$ hereinafter) of the vehicle. A steering angle sensor 12 detects steering angle $\delta$ of the steering wheel and outputs the signal to the deceleration controller 10. The wheel speed sensors 13FL, 13FR, 13RL, and 13RR detect the revolving speeds, that is the wheel velocities $Vw_i(i=FL\sim RR)$ of respective wheels 2FL, 2FR, 2RL, and 2RR (collectively, Vw) and outputs the signals to the deceleration controller 10. An accelerator sensor 14 detects depression amount (e.g., opening angle $\theta_{th}$) of an accelerator, not shown, and outputs the signal to the deceleration controller 10. A second acceleration sensor 15 detects lateral acceleration Yg generated by the vehicle and outputs the signal to the deceleration controller 10.

Figure 2:
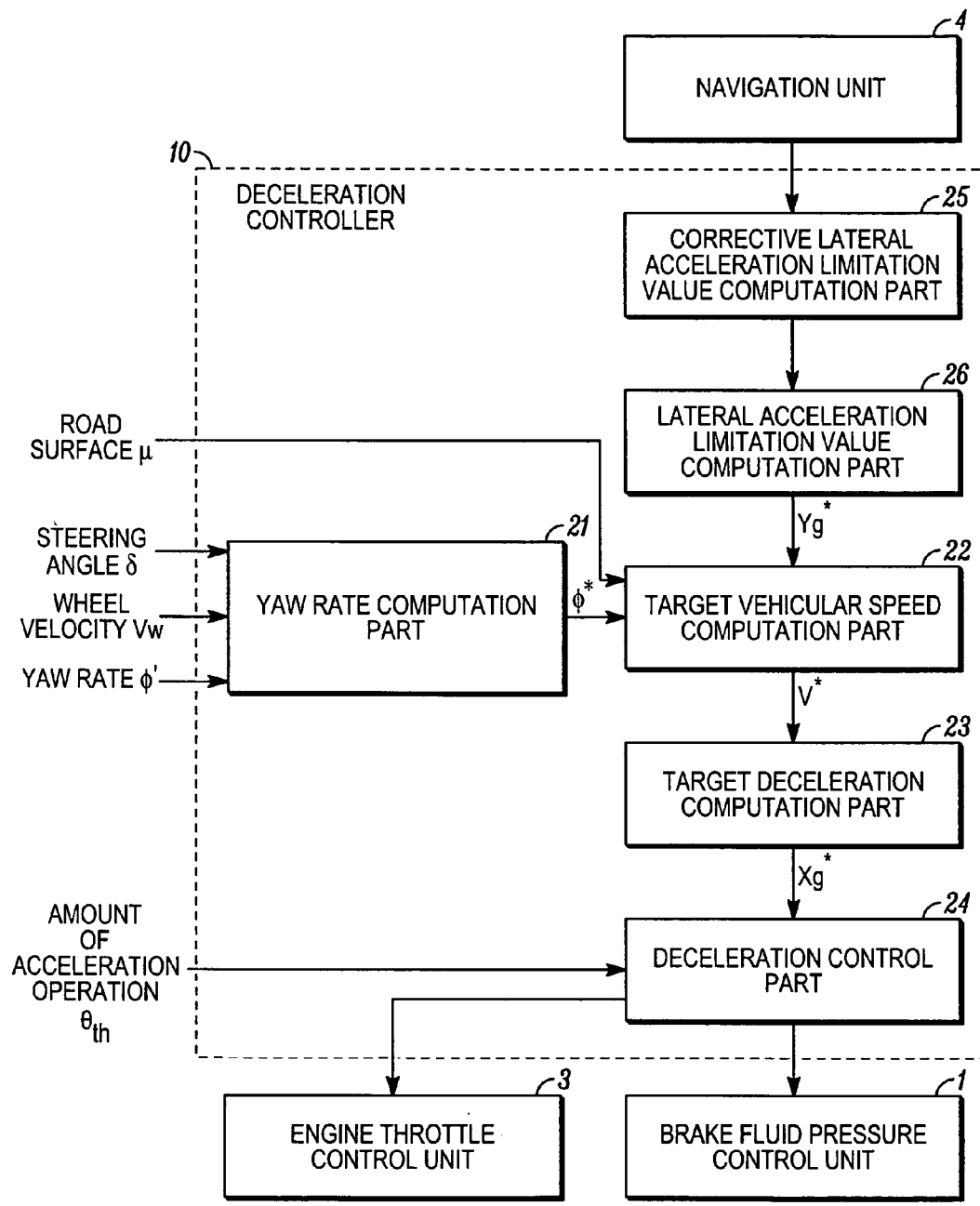
FIG. 2 is a block diagram illustrating the deceleration control apparatus in accordance with an embodiment of the invention.

As shown in FIG. 2, for example, the deceleration controller 10 is equipped with a yaw rate computation part 21, which computes a selected yaw rate $\phi^*$ to be used for arithmetic processing based on the steering angle $\delta$ sent from the steering angle sensor 12, the vehicle velocities $Vw_{FL}$ through $Vw_{RR}$ sent from the speed sensors 13FL through 13RR, and the measured yaw rate $\phi'$ sent from the yaw rate sensor 11. The deceleration controller 10 also includes a lateral acceleration limitation value computation part 26, which computes lateral acceleration limitation value Yg*, and a corrective lateral acceleration limitation value computation part 25, which corrects the corrective lateral acceleration value Yg* computed by the lateral acceleration limitation value computation part 26. A target vehicular speed computation part 22 of the deceleration controller 10 computes target vehicular speed V* based on the selected yaw rate $\phi^*$ from the yaw rate computation part 21, the lateral acceleration limitation value Yg* computed by lateral acceleration limitation value computation part 26, and a road-surface friction coefficient $\mu$. A target deceleration computation part 23 of the deceleration controller 10 computes target deceleration Xg* based on target vehicular speed V*, which is computed by the target vehicular speed computation part 22. Finally, the deceleration controller 10 includes a deceleration control part 24, which drives the brake fluid pressure control unit 1 and the engine throttle control unit 3 so as to realize the target deceleration Xg* computed by the target deceleration computation part 23.

Figure 3:
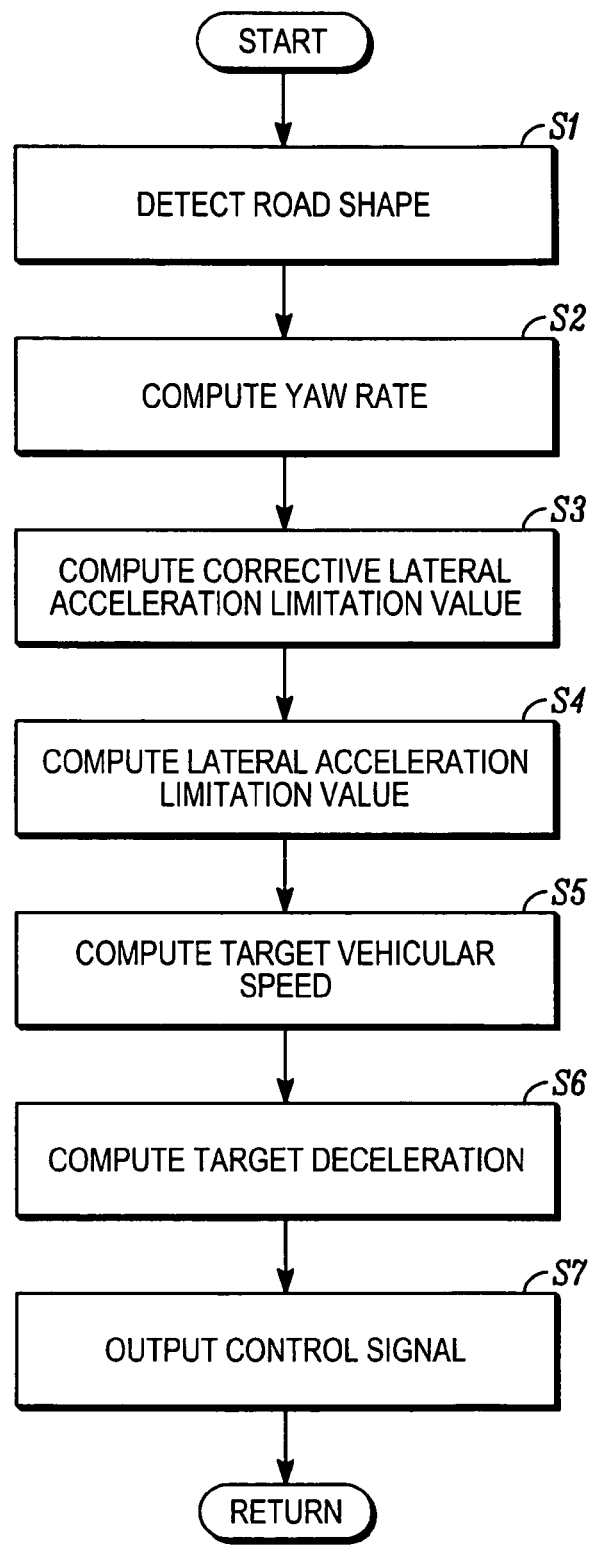
FIG. 3 is a flow chart illustrating deceleration control performed in accordance with an embodiment of the invention.

The flow chart of FIG. 3 shows the deceleration control process executed by the deceleration controller 10. The deceleration controller can be any controller, for example, a standard engine microcontroller that includes a central processing unit (CPU), random access memory (RAM), read only memory (ROM) and input/output ports receiving input signals and sending the command signal as discussed in more detail below. The processing parts (e.g., programming instructions) described herein are generally stored in memory, and the functions of each of the parts is performed by the logic of the CPU. Of course, the controller that performs the functions of each of the parts described herein could also be part of a dedicated microcontroller or could be a microprocessor using external memory. As described herein, the deceleration control process is executed in the form of timer interrupt process at prescribed intervals.

In step (denoted as S hereafter) 1, the road shape, in particular a curve, is detected by navigation unit 4 shown in FIG. 1. Navigation unit 4 detects the curve ahead, in the direction of vehicle travel, based on information regarding the road shape ahead of the vehicle. More specifically, the radius value R of the curve is computed using a three-point method involving nodes, linkage relationship among the nodes, road type, and link type in order to detect the road shape. Here, the radius value R may be embedded in the navigation system or the nodes.

Figure 4:
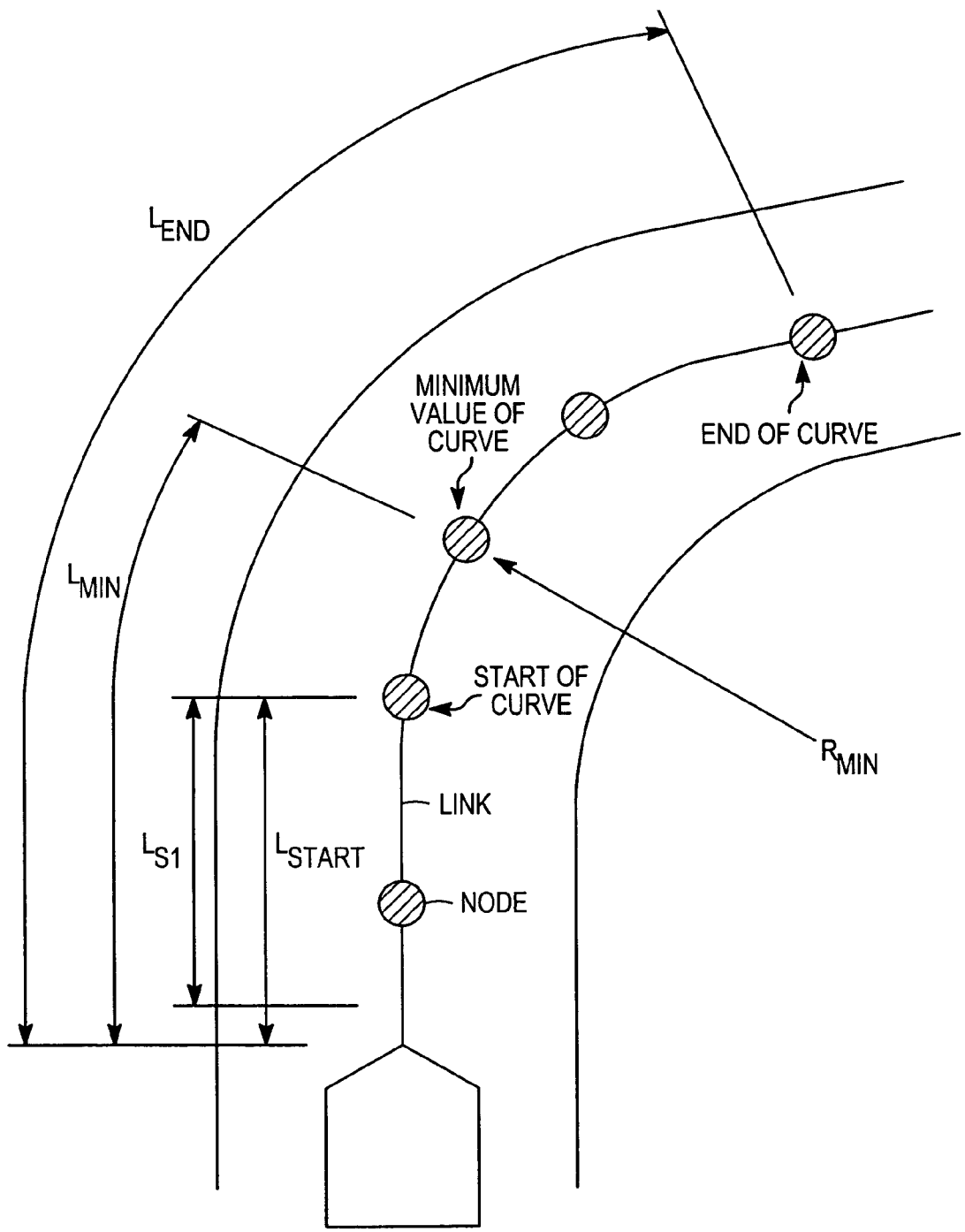
FIG. 4 is a diagram illustrating the distance $L_{START}$ to the start of a curve, the minimum value $R_{MIN}$ of R, the distance $L_{MIN}$ to the minimum value of the curve, and the distance $L_{END}$ to the end of the curve, which are used for controlling deceleration performed in accordance with an embodiment of the invention.

As shown in FIG. 4, navigation unit 4 computes distance $L_{START}$ to the start of the curve (the node corresponding to the start of the curve), minimum value $R_{MIN}$ of value R of the curve, distance $L_{MIN}$ to the curve minimum value (the node corresponding to minimum value $R_{MIN}$), distance $L_{END}$ to the end of the curve (the node corresponding to the end of the curve), and curve direction $R_{dir}$ based on the node information. Navigation unit 4 then outputs the above computed values to corrective lateral acceleration limitation value computation part 25.

Figure 5:
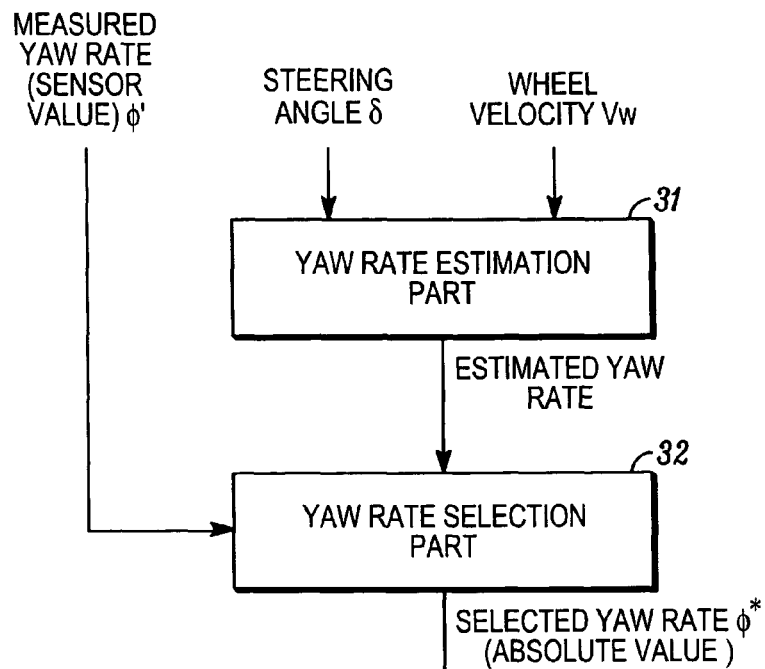
FIG. 5 is a block diagram illustrating an example of a yaw rate computation used for controlling deceleration.

In S2, a yaw rate is computed. Computation of the yaw rate is carried out by yaw rate computation part 21 shown in FIG. 2. As illustrated in FIG. 5, yaw rate computation part 21 is equipped with yaw rate estimation part 31 and yaw rate selection part 32. Yaw rate estimation part 31 estimates a yaw rate $\phi_e$ based on steering angle $\delta$ detected by steering angle sensor 12 and wheel velocities Vw detected by wheel speed sensors 13. The estimated yaw rate $\phi_e$ is estimated using a widely used technique based on the steering angle $\delta$ and the vehicular speed or wheel velocity. Yaw rate estimation part 31 outputs the estimated yaw rate $\phi_e$ (referred as estimated yaw rate $\phi_e$ hereinafter) to yaw rate selection part 32. Yaw rate selection part 32 performs select-high by selecting the higher value between the estimated yaw rate $\phi_e$ input from yaw rate estimation part 31 and the measured yaw rate $\phi'$ detected by yaw rate sensor 11.

Generally, the estimated yaw rate $\phi_e$ calculated from the steering angle can be obtained more quickly than the measured yaw rate $\phi'$ detected by yaw rate sensor 11. However, a case may occur in which the vehicle behavior changes in a direction such that the measured yaw rate $\phi'$ increases without much turning of the steering wheel while traveling on a road with a low friction coefficient, for example, in the case of a slow spin mode. The select-high between the estimated yaw rate $\phi_e$ and the measured yaw rate $\phi'$ is performed to allow selection of the measured yaw rate $\phi'$ when applicable, whereby when the measured yaw rate $\phi'$ is higher, the measured yaw rate $\phi'$ is selected for prompt engagement of deceleration control. Yaw rate selection part 32 outputs the value selected through select-high as selected yaw rate value $\phi^*$ (>0).

Figure 6:
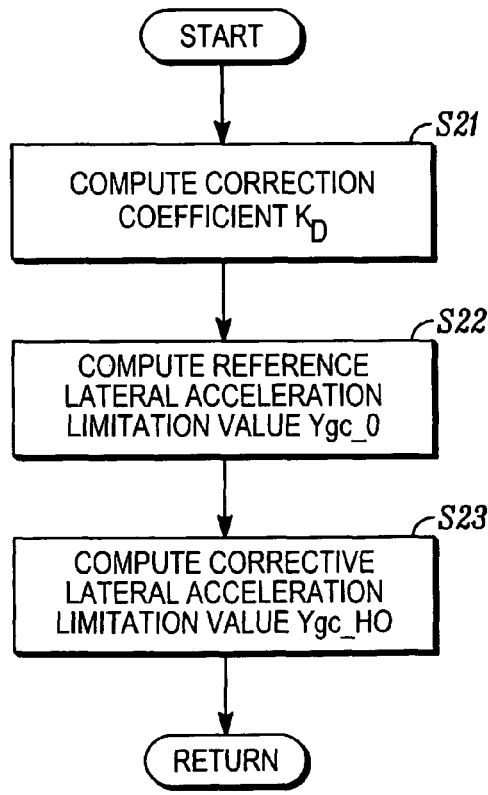
FIG. 6 is a flow chart illustrating the corrective lateral acceleration limitation value computation performed in accordance with an embodiment of the invention.

Returning to FIG. 3, in S3, a corrective lateral acceleration limitation value is computed by corrective lateral acceleration limitation value computation part 25 shown in FIG. 2 according to the execution illustrated in the flow chart of FIG. 6.

Figure 7:
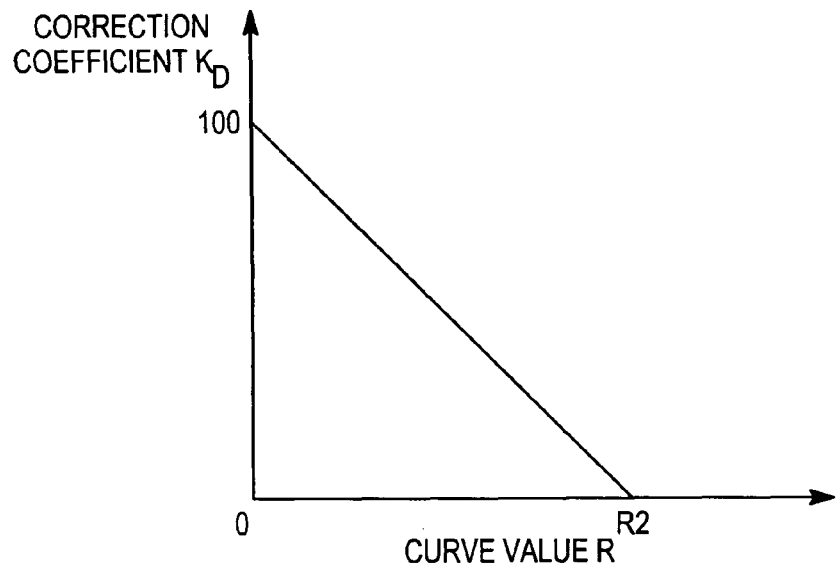
FIG. 7 is a graph illustrating a first application example of the relationship between value R and a correction coefficient $K_D$.

Referring to FIG. 6, in S21 a correction coefficient $K_D$ is computed. More specifically, as shown in FIG. 7, correction coefficient $K_D$ is computed based on value R output by navigation unit 4 in S1, wherein correction coefficient $K_D$ increases as value R decreases. Value R used for the computation of correction coefficient $K_D$ is value R of minimum value $R_{MIN}$ of the curve. As shown in FIG. 7, the correction coefficient $K_D$ is set in the range of 0-100.

The correction coefficient $K_D$ is set when curve value R is lower than upper limit value R2, for example, 300R. That is, correction coefficient $K_D$ is set within maximum value R2.

Figure 8:
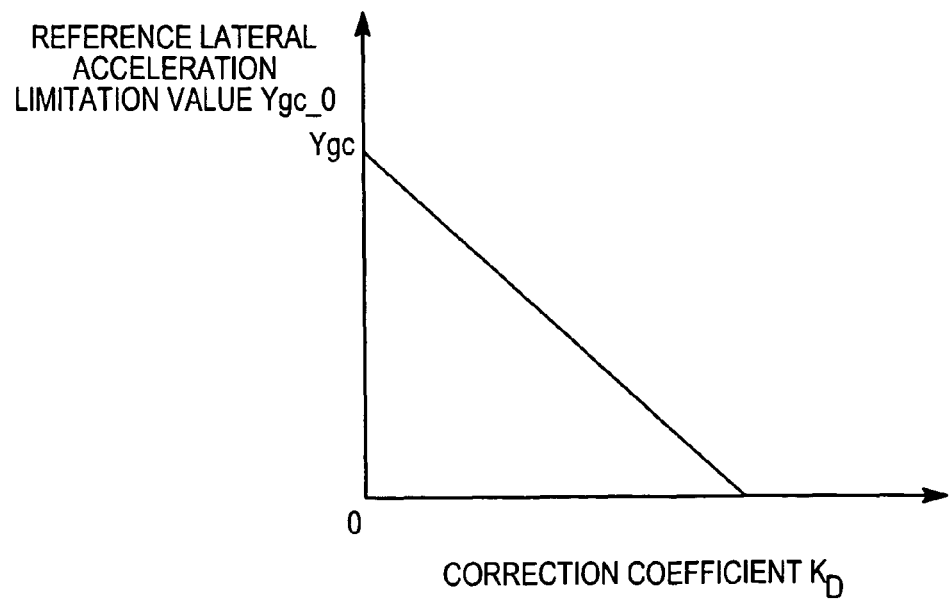
FIG. 8 is a graph illustrating a first application example of the relationship between a correction coefficient $K_D$ and a reference lateral acceleration limitation value Ygc_0.

In S22, a reference lateral acceleration limitation value Ygc_0, which is used for computing a corrective lateral acceleration limitation value Ygc_HO in S23, to be described later, is set. The reference lateral acceleration limitation value Ygc_0 is computed based on correction coefficient $K_D$ computed in S21. For example, as shown in FIG. 8, reference lateral acceleration limitation value Ygc_0 is set at a higher value, with the provision that prescribed value Ygc is the upper limit, as correction coefficient $K_D$ decreases. As a result, reference lateral acceleration limitation value Ygc_0 is set at a value lower than prescribed value Ygc (Ygc_0≦Ygc).

As described above, because correction coefficient $K_D$ is set at 0 when value R is higher than the maximum value R2, the reference lateral acceleration limitation value Ygc_0 is set at prescribed value Ygc (the value when correction coefficient $K_D$ is 0). Here, for example, the prescribed value Ygc is 0.45 g.

Figure 9:
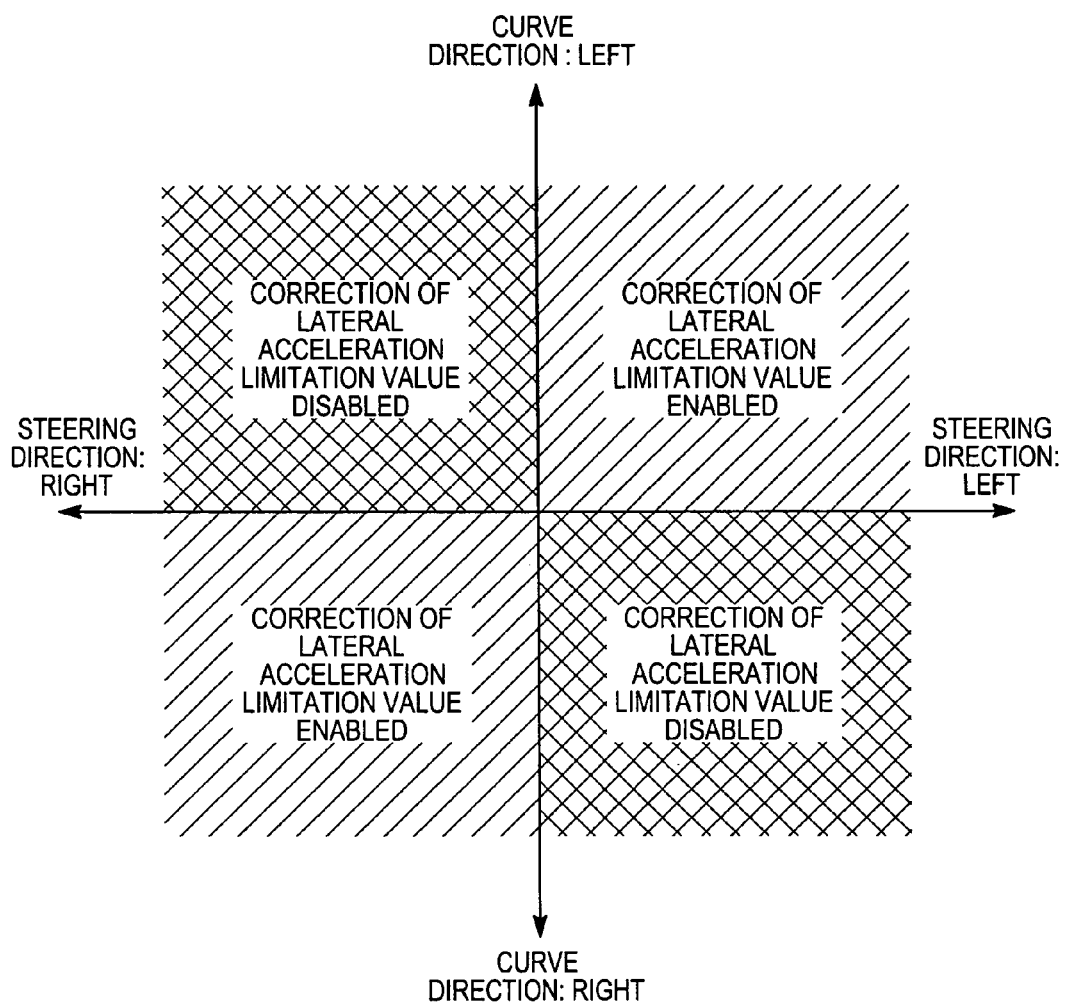
FIG. 9 is a diagram illustrating whether a reference lateral acceleration limitation value can be set in accordance with an embodiment of the invention.

Whether reference lateral acceleration limitation value Ygc_0 can be set is determined based on the direction of the steering wheel. As shown in FIG. 9, setting of reference lateral acceleration limitation value Ygc_0 is disabled when curve direction $R_{dir}$ output from navigation unit 4 does not match the steering wheel direction (i.e., the direction turned by the driver) in S1, and setting of reference lateral acceleration limitation value Ygc_0 is enabled when curve direction $R_{dir}$ output from navigation unit 4 matches the steering wheel direction. Then, as illustrated in FIG. 8, when setting of the reference lateral acceleration limitation value Ygc_0 is enabled, the reference lateral acceleration limitation value Ygc_0 is set based on correction coefficient $K_D$. When setting of the reference lateral acceleration limitation value Ygc_0 is disabled (i.e., when setting is prohibited), the reference lateral acceleration limitation value Ygc_0 is set at the prescribed value Ygc.

Figure 10:
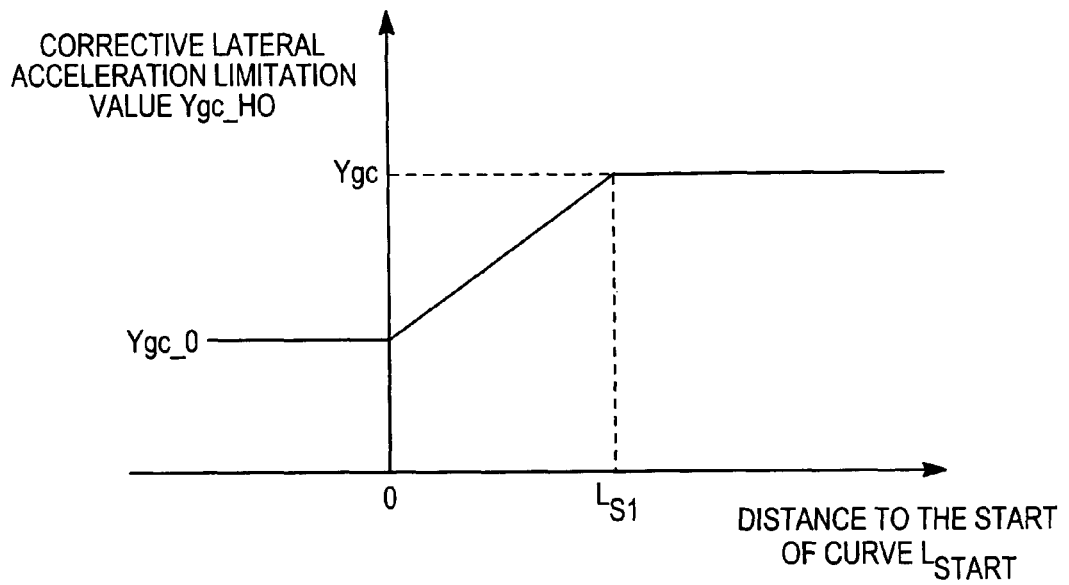
FIG. 10 is a graph illustrating the relationship between distance $L_{START}$ to the start of a curve and a corrective lateral acceleration limitation value Ygc_HO.

Referring again to FIG. 6, in S23 corrective lateral acceleration limitation value Ygc_HO, which is used to correct lateral acceleration limitation value Yg to be described later, is computed. As shown in FIG. 10, when distance $L_{START}$ to the start of the curve is greater than prescribed value $L_{S1}$ (refer to FIG. 4), that is, when the vehicle is traveling, before reaching the position at prescribed distance $L_{S1}$ from the start of the curve, corrective lateral acceleration limitation value Ygc_HO is set at prescribed value Ygc. When distance $L_{START}$ to the start of the curve decreases below prescribed value $L_{S1}$, corrective lateral acceleration limitation value Ygc_HO is brought increasingly closer to reference lateral acceleration limitation value Ygc_0, which was set based on correction coefficient $K_D$ in S22. The distance $L_{START}$ decreases until the start of the curve ($L_{START}=0$) is reached. When the start of the curve ($L_{START}=0$) is passed, corrective lateral acceleration limitation value Ygc_HO is set at reference lateral acceleration limitation value Ygc_0, which was set based on correction coefficient $K_D$ in S22.

That is, when $L_{START} > L_{S1}$, corrective lateral acceleration limitation value Ygc_HO is computed based on equation (1):

$$Ygc\_HO = Ygc \tag{1}$$

When $L_{START} \leq Ls1$, corrective lateral acceleration limitation value Ygc_HO is computed based on equation (2):

$$Ygc\_HO = (Ygc - Ygc\_0)/L_{S1} \times L_{START} + Ygc\_0 \tag{2}$$

When $L_{START} < 0$, that is when the point at which value R becomes minimum value $R_{MIN}$ has been passed, corrective lateral acceleration limitation value Ygc_HO is computed based on equation (3):

$$Ygc\_HO = Ygc\_0 \tag{3}$$

Reference lateral acceleration limitation value Ygc_0 decreases as correction coefficient $K_D$ increases (as value R decreases), referring to S22, and the corrective lateral acceleration limitation value Ygc_HO, which is set using the reference lateral acceleration limitation value Ygc_0, decreases as correction coefficient $K_D$ increases (as value R decreases) when $L_{START} \leq L_{S1}$ or $L_{START} < 0$.

Figure 11:
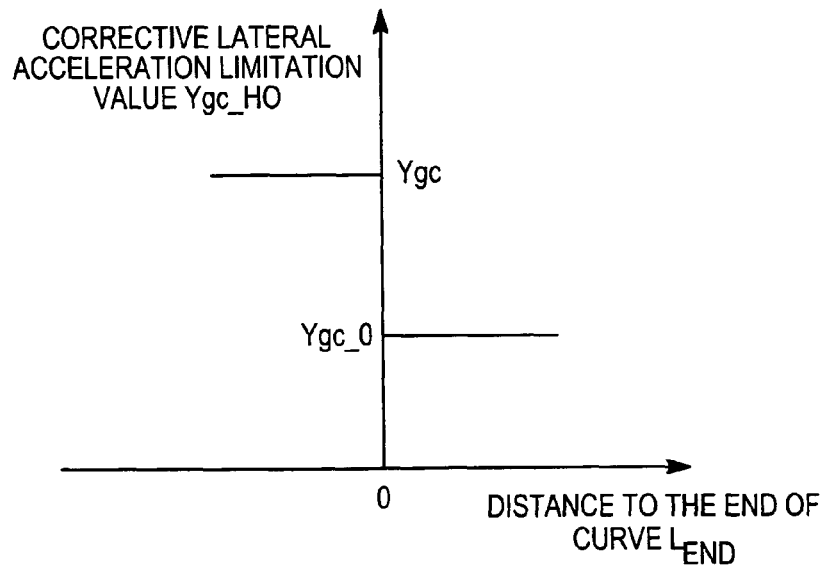
FIG. 11 is a graph illustrating a first application example of the relationship between distance $L_{END}$ to the end of a curve and a corrective lateral acceleration limitation value Ygc_HO.

Next, corrective lateral acceleration limitation value Ygc_HO, which is used for ending correction of the lateral acceleration limitation value, is set. For example, as shown in FIG. 11, corrective lateral acceleration limitation value Ygc_HO is switched from reference lateral acceleration limitation value Ygc_0 to prescribed value Ygc at the point where distance $L_{END}$ to the end of the curve is passed ($L_{END} = 0$).

Figure 12:
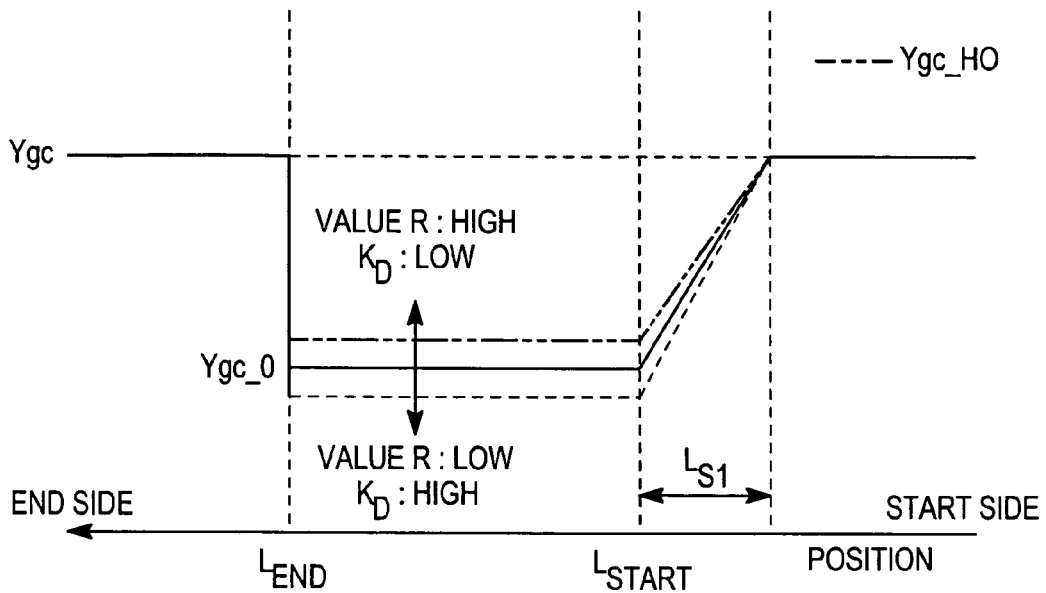
FIG. 12 is a graph illustrating the relationship between traveling position along a curve and a corrective lateral acceleration limitation value Ygc_HO.

As a result of S23, corrective lateral acceleration limitation value Ygc_HO changes, as shown in FIG. 12, for the section proceeding prescribed value $L_{S1}$ before the start of the curve (the point that corresponds to $L_{START}$), the section of prescribed value $L_{S1}$, the section between the start of the curve (the point that corresponds to $L_{START}$) and the end of the curve (the point that corresponds to $L_{END}$), and the section after the end of the curve (a point after $L_{END}$). Corrective lateral acceleration limitation value Ygc_HO is set according to the position where the vehicle is traveling with respect to the curve. Furthermore, as will be described later, because lateral acceleration limitation value Yg* is set based on corrective lateral acceleration limitation value Ygc_HO, it can be said that lateral acceleration limitation value Yg* is set according to a given position of vehicle travel with respect to the curve.

As described above in S3, correction coefficient $K_D$ is computed based on value R of the curve (in S21 of FIG. 6), reference lateral acceleration limitation value Ygc_0 is computed based on the computed correction coefficient $K_D$ (in S22 of FIG. 6), and corrective lateral acceleration limitation value Ygc_HO is computed using the computed reference lateral acceleration limitation value Ygc_0 (in S23 of FIG. 6).

Prescribed value $L_{S1}$ may be replaced by time. When a prescribed amount of time with respect to the start of the curve has been reached ($L_{START} = 0$), corrective lateral acceleration limitation value Ygc_HO is gradually brought closer to reference lateral acceleration limitation value Ygc_0, which was set based on correction coefficient $K_D$ in S22, until the vehicle reaches the start of the curve.

Referring back to FIGS. 2 and 3, in S4 lateral acceleration limitation value Yg* is computed. The computation is carried out by lateral acceleration limitation value computation part 26. Lateral acceleration limitation value Yg* is a value for limiting target lateral acceleration for stable travel of the vehicle while on the curve. Lateral acceleration limitation value Yg* is computed using equation (4):

$$Yg^* = Ygc\_HO + Ygv + Yga \tag{4}$$

where Ygc_HO is the corrective lateral acceleration limitation value computed in S3, Ygv is a velocity-sensitive lateral acceleration correction value (a corrective value set according to the vehicular speed), and Yga is an accelerator-sensitive lateral acceleration correction value (a corrective value set according to the accelerator opening angle).

In regard to the relationship with value R, as described above a correction is made to reduce (i.e., a larger amount of correction is applied to) corrective lateral acceleration limitation value Ygc_HO as value R decreases. Lateral acceleration limitation value Yg* is not corrected much when value R is high. Therefore, the limitation value of the target lateral acceleration increases, getting closer to prescribed value Ygc.

Figure 13:
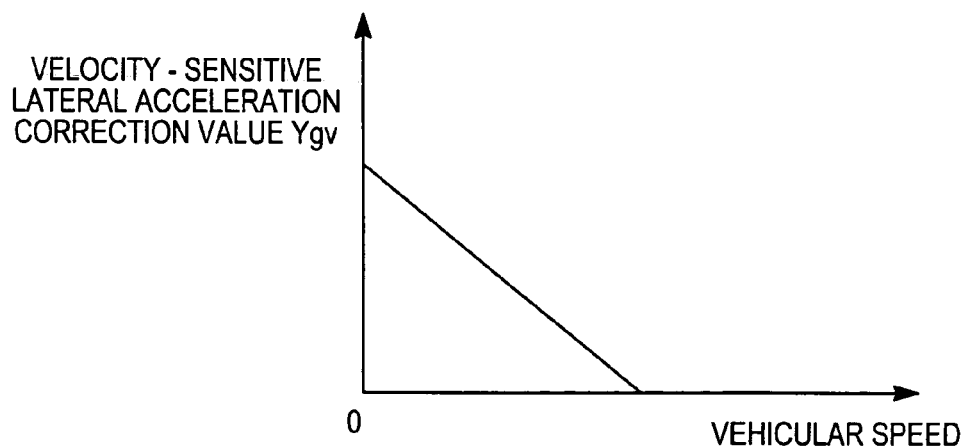
FIG. 13 is a graph illustrating the relationship between vehicular speed and a velocity-sensitive lateral acceleration correction value Ygv.
Figure 14:
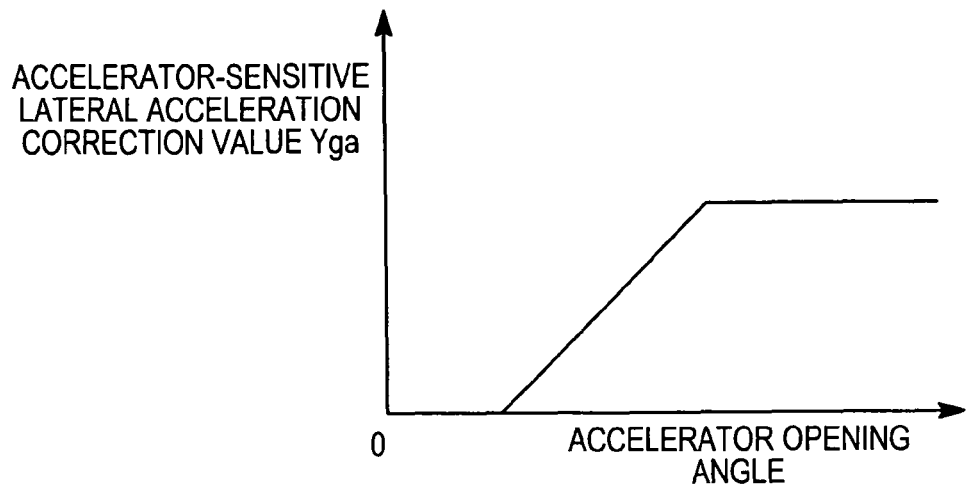
FIG. 14 is a graph illustrating the relationship between the accelerator opening and an accelerator-sensitive lateral acceleration correction value Yga.

As shown in FIG. 13, for example, velocity-sensitive lateral acceleration correction value Ygv decreases as vehicular speed V increases. And as shown in FIG. 14, for example, accelerator-sensitive lateral acceleration correction value Yga increases as the accelerator opening angle increases. When the opening angle of the accelerator has reached a certain level, accelerator-sensitive lateral acceleration correction value Yga takes a fixed value. Therefore, the accelerator-sensitive lateral acceleration correction value Yga increases as the accelerator opening angle increases.

Referring back to FIG. 3, in S5 target vehicular speed V* is computed. The computation is carried out by target vehicular speed computation part 22 shown in FIG. 2. The target vehicular speed V* is computed according to equation (5):

$$V^* = \mu \times Yg^*/\phi^* \tag{5}$$

Figure 15:
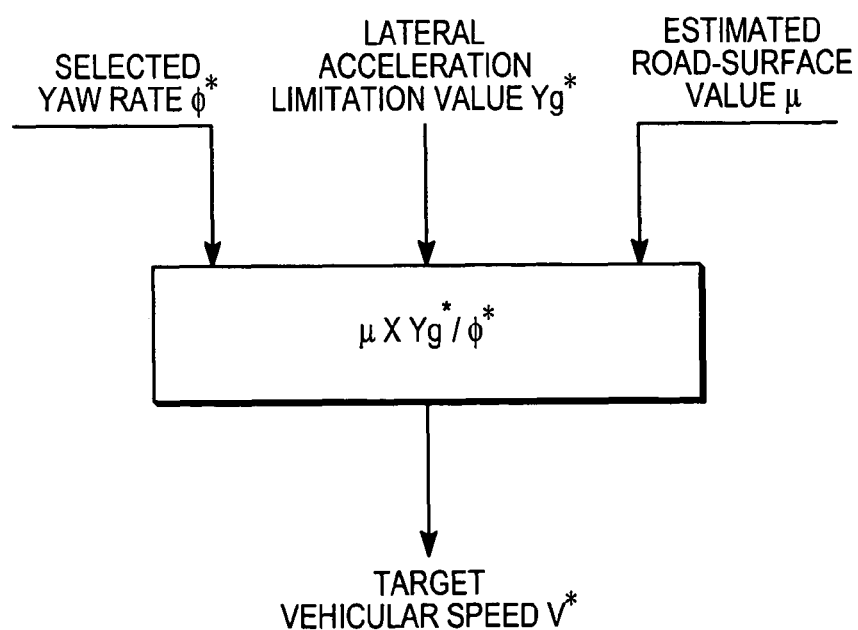
FIG. 15 is a diagram illustrating the input/output of data at a target vehicular speed computed in accordance with an embodiment of the invention.

The target vehicular speed is calculated based on road-surface friction coefficient (estimated value) μ, lateral acceleration limitation value Yg* and selected yaw rate φ* as shown in FIG. 15.

According to equation (5), target vehicular speed V* is reduced as road-surface friction coefficient μ decreases, target vehicular speed V* is reduced as lateral acceleration limitation value Yg* decreases, and target vehicular speed V* is reduced as selected yaw rate φ* increases.

In S6 target deceleration Xg* is computed. The computation is carried out by target deceleration computation part 23 shown in FIG. 2. Target deceleration Xg is computed using equation (6):

$$Xg^* = K \times \Delta V/\Delta t \tag{6}$$

where ΔV indicates the value of the difference (speed deviation value) between vehicular speed V and target vehicular speed V* computed in S5 (ΔV=V−V*), Δt indicates a prescribed time (time required to zero-out the speed deviation value), and K indicates a prescribed gain.

According to equation (6), as speed deviation value ΔV is increased, that is, as the difference between vehicular speed V and target vehicular speed V* is increased in the positive direction, the target deceleration Xg* is also increased. Because the target vehicular speed V* is reduced as selected yaw rate φ* increases, vehicular speed deviation ΔV is increased, and target deceleration Xg* increases. The target vehicular speed V* is increased as lateral acceleration limitation value Yg* increases, vehicular speed deviation ΔV is reduced, and target deceleration Xg* is reduced. Conversely, because target vehicular speed V* is also reduced as lateral acceleration limitation value Yg* is decreased, vehicular speed deviation ΔV and target deceleration Xg* are increased.

The target deceleration Xg* may be computed using equation (7) given below in consideration of a difference in the speed deviation:

$$Xg^* = (K1 \times \Delta V + K2 \times d\Delta V)/\Delta t \tag{7}$$

where $d\Delta V$ indicates the deviation value obtained by subtracting a past value $\Delta Vz$ of speed deviation $\Delta V$ from the current speed deviation $\Delta V(d\Delta V=\Delta V-\Delta Vz)$, and K1 and K2 are prescribed gains.

Because target deceleration can be computed promptly to reduce the speed promptly, when the steering wheel is operated quickly deceleration can be applied quickly.

Referring again to FIG. 3, in S7 control signal output processing is carried out, whereby control signals are output to control engine throttle control unit 3 and brake fluid pressure control unit 1 to match the actual deceleration with target deceleration Xg* computed in S6. The deceleration control process is carried out by deceleration control part 24 of the deceleration controller 10 shown in FIG. 2 as shown in the deceleration control process illustrated in the flow chart of FIG. 16.

Figure 16:
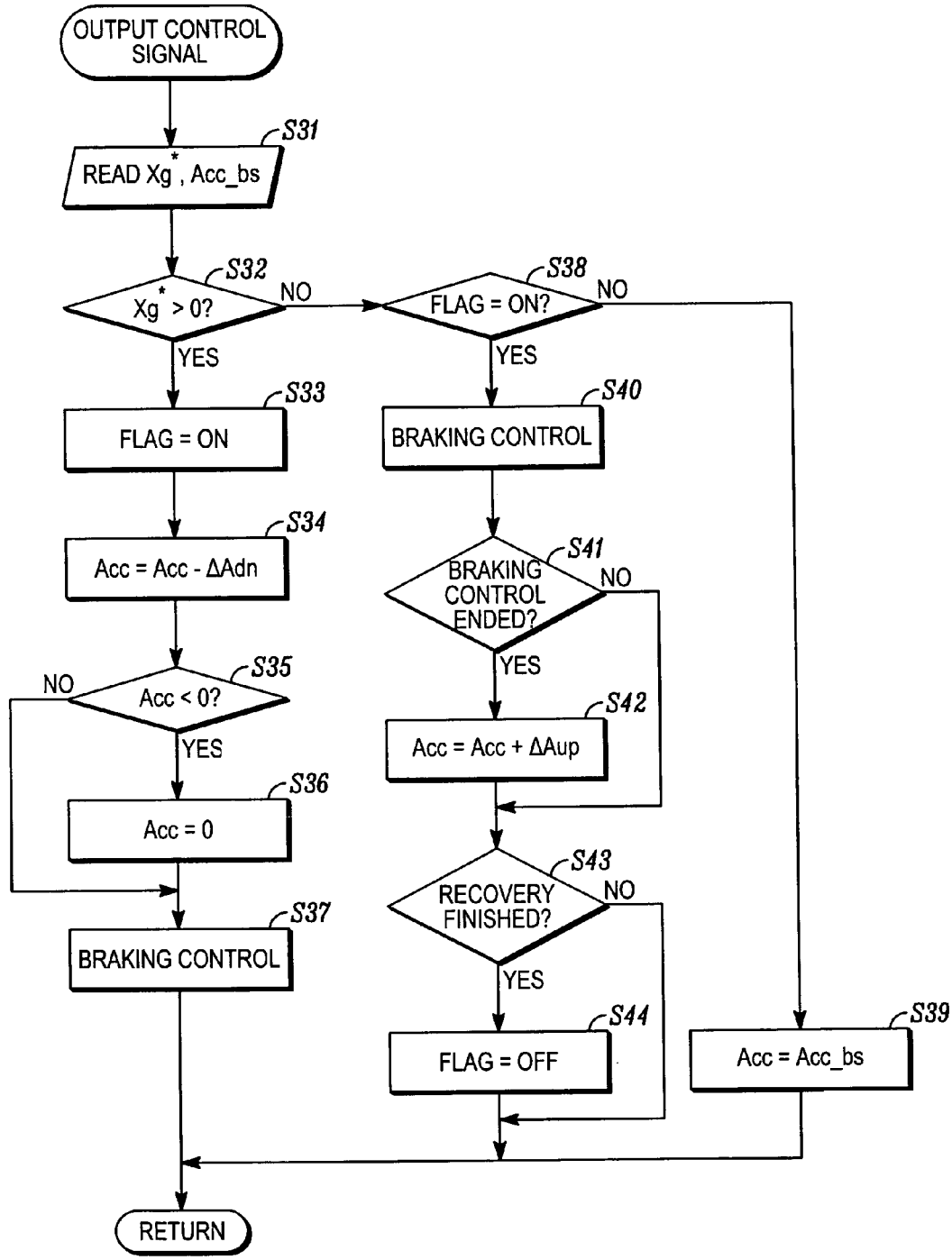
FIG. 16 is a flow chart illustrating the control signal output during the deceleration control performed in accordance with an embodiment of the invention.

Referring now to FIG. 16, in S31 target deceleration Xg* computed in S6 and base throttle opening angle Acc_bs (corresponds to the accelerator opening angle $\theta_{th}$) are read.

In S32, it is determined whether target deceleration Xg* is positive. When the judgment result of S32 indicates Xg*>0, that is, when target deceleration Xg* is a value that requires deceleration, a transition is made to S33. When Xg*≦0, that is, when target deceleration Xg* is a value that requires acceleration, a transition is made to S38.

In S33 a deceleration control involvement flag, which indicates deceleration control is involved, is set to ON (FLAG=ON), and target throttle opening Acc is reduced by prescribed value $\Delta Adn$ upon moving to S34. The amount of reduction of the target throttle opening angle Acc is calculated by equation (8):

$$Acc=Acc-\Delta Adn \qquad (8)$$

The initial value of the target throttle opening angle is base throttle opening angle Acc_bs read in S31. The vehicular speed is reduced through throttle control, that is, the throttle opening angle is reduced from a given throttle opening angle, which corresponds to the amount the accelerator is operated by the driver by prescribed value $\Delta Adn$ at each sampling when target deceleration Xg* is positive.

In S35 whether target throttle opening angle Acc is negative is determined. A transition is made to S36 when Acc<0 in order to set target throttle opening angle Acc at 0 before moving to S37. A transition is made to S37 without doing anything when Acc≧0. Hence, the target throttle opening angle Acc never falls below 0.

In S37 braking control is applied, timer interrupt process is ended, and processing returns to the main program. Braking is controlled by applying braking in a fixed manner using brake fluid pressure control unit 1 until the brake fluid pressure is increased to a fixed value.

The throttle control by engine throttle control unit 3 in S34 through S36 and the braking control in S37 are carried out in order to attain target deceleration Xg*.

In S38, whether the deceleration involvement flag is ON is determined. A transition is made to S39 when FLAG=OFF indicating that deceleration is not involved; or a transition is made to S40 when FLAG=ON indicating that target deceleration Xg* is positive, and deceleration control is applied.

In S39 base throttle opening Acc_bs is set as target throttle opening angle Acc, and the timer interrupt process is ended without involving deceleration control before returning to the main program. The relationship between base throttle opening angle Acc_bs and target throttle opening angle Acc as described above is below:

$$Acc=Acc\_bs \qquad (9)$$

In S40 braking control is applied. The brakes are controlled by reducing the brake fluid pressure using brake fluid pressure control unit 1.

Next, in S41, whether braking control has ended is determined. If braking control has ended, the throttle is recovered upon moving to S42, and a transition is made to S43. However, if the result of S41 indicates that braking control has not ended, a transition is made to S43 without doing anything.

In S42 throttle opening angle Acc is increased by prescribed value $\Delta Aup$:

$$Acc=Acc+\Delta Aup \qquad (10)$$

Hence, the throttle is recovered by increasing the throttle opening angle by prescribed value $\Delta Aup$ at each sampling.

In S43, whether recovery has finished is determined. Recovery has finished if the throttle opening angle has recovered to the level that corresponds to the accelerator operation amount performed by the driver, and a transition is made to S44 where the timer interrupt process is ended upon resetting deceleration control involvement Flag to OFF. The process then returns to a prescribed main program.

However, if recovery has not yet finished in response to the query of S43, timer interrupt processing is ended immediately, and the process returns to a prescribed main program in order to continue with throttle recovery.

Now, assume that target deceleration Xg* is equal to or lower than 0 (Xg*≦0). In this situation, a transition is made to S38 according to the decision made in S32. Assuming that deceleration control has never been involved and the deceleration involvement flag is set to the initial value of OFF, a transition is made from S38 to S39, and target throttle Acc is set at base throttle opening angle Acc_bs that corresponds to the acceleration operation amount performed by the driver. Thus, in this situation, deceleration control does not get involved, and the vehicle continues to travel according to accelerator operation performed by the driver.

Assume that the vehicle has moved into a condition of travel along a curve, and that lower target vehicular speed V* is computed as the yaw rate generation of the vehicle increases, and that higher target deceleration Xg* is computed as a result. In this situation, a transition is made from S32 to S33, and the deceleration control involvement flag is set to ON. Throttle control is applied to control target throttle opening angle Acc gradually from base throttle opening angle Acc_bs as the initial value, and deceleration control is implemented to reduce the vehicular speed through braking control at the same time.

Overspeed at a corner can be restrained through deceleration control. In addition, even if the driver is operating the accelerator, deceleration control can be applied without subjecting the driver to a sense of discomfort by reducing throttle opening angle $\Delta Adn$ gradually.

When target deceleration Xg* returns to 0 or lower as the vehicle passes the curve, a transition is made from S32 to S38. Because deceleration control is applied once when Xg*>0, and the deceleration control involvement flag is set to ON, a transition is made to S40 based on the decision made in S38 in order to control the brake fluid pressure so that the pressure is reduced. After the braking control is finished, the throttle opening angle is recovered to the level that corresponds to the accelerator operation amount performed by the driver. When the throttle is fully recovered, deceleration control involvement flag is reset to OFF before ending deceleration control.

Therefore, when the target deceleration has moved from the decelerating side to the accelerating side, the throttle control and braking control are carried out for recovery. Acceleration control can be applied without subjecting the driver to an abrupt sensation by gradually increasing throttle opening angle ΔAup even if the driver is operating on the accelerator.

As described above, when corrective lateral acceleration limitation value Ygc_HO is set based on a given position of the vehicle with respect to a curve (in S3 of FIG. 3), lateral acceleration control value Yg* is computed based on the corrective lateral acceleration limitation value Ygc_HO (in S4 of FIG. 3), target lateral acceleration V* and target deceleration Xg* are computed based on the lateral acceleration control value Yg* (in S5 and S6 of FIG. 3) so that the timing of the involvement of braking control changes according to the travel position of the vehicle with respect to the curve.

When target deceleration Xg* is greater than 0, deceleration control will be implemented. Because target deceleration Xg* increases as target vehicular speed V* is reduced, the timing of involvement of deceleration control is set forward (refer to equation (6)). In addition, because target vehicular speed V* is reduced as lateral acceleration limitation value Yg* decreases (refer to equation (5)), deceleration control intervention timing is set forward as lateral acceleration limitation value Yg* decreases.

In addition, because lateral acceleration limitation value Yg* decreases as corrective lateral acceleration limitation value Ygc_HO decreases (refer to equation (4)), deceleration control intervention timing is set forward as corrective lateral acceleration limitation value Ygc_HO decreases.

Because corrective lateral acceleration limitation value Ygc_HO decreases as reference lateral acceleration limitation value Ygc_0 decreases (refer to S23 of FIG. 6), deceleration control intervention timing is set forward as reference lateral acceleration limitation value Ygc_0 decreases.

In addition, because reference lateral acceleration limitation value Ygc_0 decreases as correction coefficient $K_D$ increases (refer to S22 of FIG. 6), deceleration control intervention timing is set forward as correction coefficient $K_D$ increases. Then, correction coefficient $K_D$ increases as curve value R decreases (refer to S22 of FIG. 6), and the deceleration control intervention timing is set forward as curve value R decreases. The forwarded deceleration control intervention timing also means that cancellation of deceleration control becomes more difficult, and thus easier to maintain. The relationship is summarized below in Table 1:

Deceleration Control Intervention Timing is Set Forward
(i.e. when cancellation of deceleration
control becomes more difficult)

| | |
|---|---|
| Target deceleration: Xg* | High |
| Target vehicular speed: V* | Low |
| Lateral speed limitation value: Yg* | Low |
| Corrective lateral acceleration limitation value: Ygc_HO | Low |
| Reference lateral acceleration limitation value: Ygc_0 | Low |
| Correction coefficient: $K_D$ | High |
| Value R | Low |

As described above, lateral speed limitation value Yg* (and accordingly the corrective lateral acceleration limitation value Ygc_HO) is set based on value R at a prescribed position within the curve, and lateral speed limitation value Yg* decreases as value R of the curve ahead of the vehicle decreases. As a result, deceleration control can be implemented more easily based on value R of the curve.

Corrective lateral acceleration limitation value Ygc_HO is gradually brought increasingly closer to reference lateral acceleration limitation value Ygc_0 until the start of the curve is reached ($L_{START}$=0) and distance $L_{START}$ to the start of the curve has reached prescribed distance $L_{S1}$ (refer to S23 of FIG. 6). Therefore, the amount of correction of lateral speed limitation value Yg* is increased gradually until the start of the curve is reached.

Reference lateral acceleration limitation value Ygc_0 is set based on value R. The value R is a value computed by navigation unit 4 based on information regarding the road shape ahead of the vehicle available from, for example, nodes. Information regarding the road shape ahead of the vehicle obtained by navigation unit 4 may sometimes contain an error. A Global Positioning System (referred hereafter as GPS) error (for example a change in the distance to the start of the curve) or and/or a map error (for example a change in the way nodes are assigned) may be involved. There are situations in which an error is involved in the detected distance between the vehicle and the curve ahead of the vehicle. Consequently, value R computed based on the road shape information ahead of the vehicle may contain an error. Although deceleration control may be involved if the driver manipulates the steering wheel, because the estimated yaw rate $\phi_e$ is estimated based on steering angle δ detected by steering angle sensor 12 in S2, the track of the vehicle steered by the driver represents the actual road shape.

Corrective lateral acceleration limitation value Ygc_HO is brought gradually closer to reference lateral acceleration limitation value Ygc_0 by gradually increasing the amount of correction of lateral speed limitation value Yg* to gradually reflect corrective lateral acceleration limitation value Ygc_HO upon lateral speed limitation value Yg* in order to prevent an influence of an error in the road shape information ahead of the vehicle on lateral speed limitation value Yg* and to apply deceleration control while reflecting the steering condition manipulated by the driver according to the actual road shape.

Whether a reference lateral acceleration limitation value can be set is determined according to the steering direction (refer to FIG. 9). The setting of a reference lateral acceleration limitation value is disabled when curve direction $R_{dir}$ does not match the steering direction (i.e., the direction steered by the driver). The setting is enabled when curve direction $R_{dir}$ matches the steering direction. The reference lateral acceleration limitation value Ygc_0 can be set only when curve direction $R_{dir}$ matches the steering direction in order to prevent correction of lateral speed limitation value Yg* by mistake when traveling in a scenario involving a curve that does not require a correction.

Correction coefficient $K_D$ is computed based on minimum value $R_{MIN}$ of value R at the curve (refer to S21 in FIG. 6). As a result, because the deceleration control intervention timing is set forward as value R decreases (refer to Table 1), the speed can be reduced well before the value R reaches minimum value $R_{MIN}$ so that the speed of the vehicle can be reduced effectively through deceleration control.

Correction coefficient $K_D$ is set when curve value R is lower than prescribed upper limit value R2 (for example, 300R); that is, correction coefficient $K_D$ is set within upper limit value R2 (refer to S21 in FIG. 6). Generally, the accuracy of the computation of value R is degraded as R increases. Value R is computed from multiple coordinates (nodes) in the case of a three-point or five-point method (or N-point method). Therefore, the accuracy of the computation of value R is improved as more nodes (coordinates) are used for the computation. A road shape involving many nodes represents a case in which R is low, and the accuracy of the computation of value R is degraded as R increases.

When maximum value R2 is set to regulate the upper limit of value R with which correction coefficient $K_D$ can be set, the correction coefficient $K_D$ can be set based on value R, which is a highly accurate computation.

Velocity-sensitive lateral acceleration correction value Ygv increases as vehicular speed V decreases (refer to FIG. 13). Therefore, the lateral acceleration limitation value Yg* also increases (refer to equation (4)). Target vehicular speed V* is increased in a low-speed area (refer to equation (5)), so that deceleration control becomes harder to apply (refer to equation (6)). The application of deceleration control is made harder while in a low-speed area to reduce driver discomfort from deceleration control being applied while in the low-speed area.

Accelerator-sensitive lateral acceleration correction value Yga increases as the accelerator opening angle is increased (refer to FIG. 14). Therefore, lateral acceleration limitation value Yg* also increases (refer to equation (4)). Target vehicular speed V* is increased as the accelerator opening angle is increased (refer to equation (5)), and the application of deceleration control becomes harder (refer to equation (6)). The application of deceleration control is made harder when the accelerator opening angle is increased in order to prevent creation of a sense of slowdown in the driver as the driver performs an acceleration operation when recovering from a corner.

Figure 17:
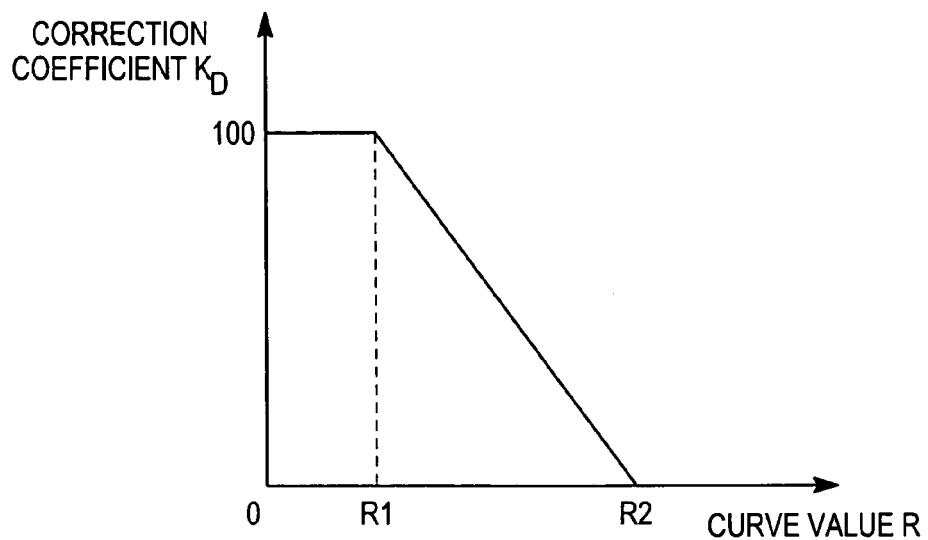
FIG. 17 is a graph illustrating a second application example of the relationship between value R and correction coefficient $K_D$.
Figure 18:
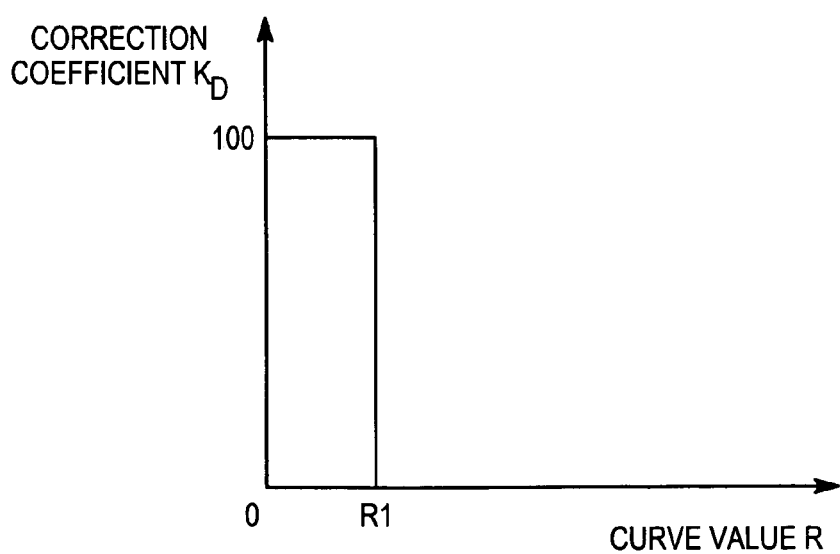
FIG. 18 is a graph illustrating another relationship between value R and correction coefficient $K_D$ in accordance with an embodiment of the invention.

In a first application example, as illustrated in FIG. 7, a specific relationship exists between value R and correction coefficient $K_D$. A second application example is shown in FIG. 17. In this second example, while correction coefficient $K_D$ is increased as value R decreases, correction coefficient $K_D$ is set at a fixed value (for example, 100R) regardless of value R when lower than R1 (<R2). As shown in FIG. 18, correction coefficient $K_D$ is set only when value R is low.

When correction coefficient $K_D$ is high, the deceleration intervention timing is set forward, or application of deceleration control is facilitated. When correction coefficient $K_D$ is high, the correction coefficient $K_D$ is computed based on a highly accurate value R (low value R). When correction coefficient $K_D$ is set at a higher value in an area where value R is low, deceleration control can be applied promptly based on a highly accurate value R, that is, a highly accurate estimation of the road shape.

Figure 19:
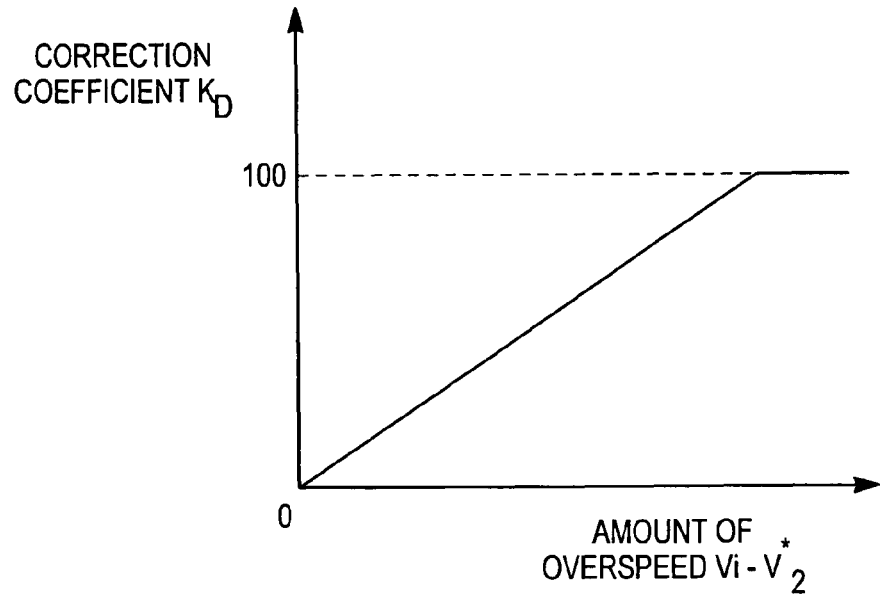
FIG. 19 is a graph illustrating the relationship between an overspeed amount and a correction coefficient $K_D$ in accordance with an embodiment of the invention.

Correction coefficient $K_D$ may be set based on the amount of overspeed. For example, as shown in FIG. 19, correction coefficient $K_D$ is increased as the amount of overspeed increases, and correction coefficient $K_D$ is set at a fixed value once the amount of overspeed has exceeded a certain value. The amount of overspeed refers to the differential value between prescribed vehicular speed $V^*_2$ and the current vehicular speed Vi, which is calculated with $Vi \geq V^*_2$ as a condition. The prescribed vehicular speed $V^*_2$ is calculated by:

$$V^*_2 = \sqrt{(Ygc \times R)} \quad (11)$$

where R represents curve value R corresponding to the given road shape, and Ygc represents a prescribed value.

The prescribed value Ygc is a value used to set lateral acceleration limitation value Yg*. Therefore, the lateral acceleration limitation value Yg* and the amount of overspeed can be set using the same index. For example, assuming that R=100 m and Ygc=0.45 g, the prescribed vehicular speed $V^*_2$ is $\sqrt{(0.45 \times 9.8 \times 100)}$=71 km/h.

Figure 20:
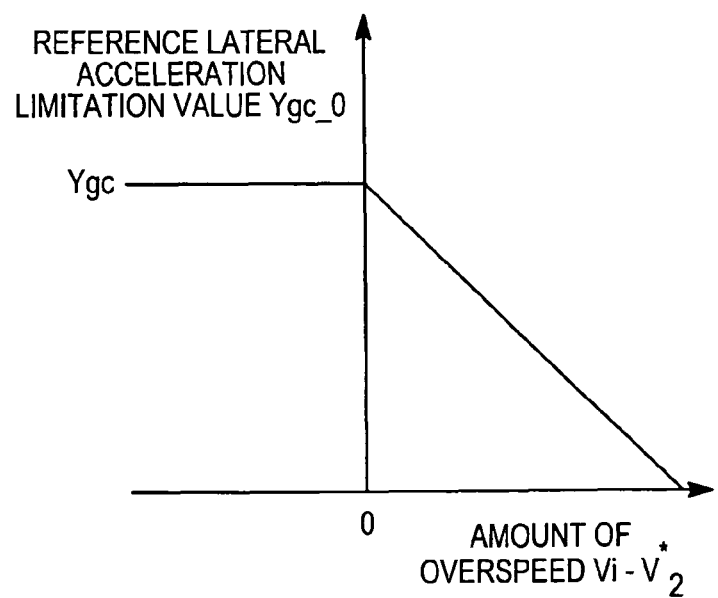
FIG. 20 is a graph illustrating the relationship between an overspeed amount and a reference lateral acceleration limitation value Ygc_0.

When correction coefficient $K_D$ is to be set based on the amount of overspeed, reference lateral acceleration limitation value Ygc_0 is set lower as correction coefficient $K_D$ increases. As a result, as shown in FIG. 20, as the amount of overspeed decreases the reference lateral acceleration limitation value Ygc_0 is set at a higher value provided that reference lateral acceleration limitation value Ygc is the upper limit. Reference lateral acceleration limitation value Ygc_0 decreases as the amount of overspeed increases, so that the deceleration control intervention timing is set forward.

Correction coefficient $K_D$ may be set based on an estimated lateral acceleration value. The estimated lateral acceleration value Yg_est is computed by:

$$Yg\_est = Vi^2/R \quad (12)$$

For example, assuming that R=100 m and Vi=25 m/sec (=90 km/h), the estimated lateral acceleration value Yg_est is 0.64 g (=$25^2$/100).

Figure 21:
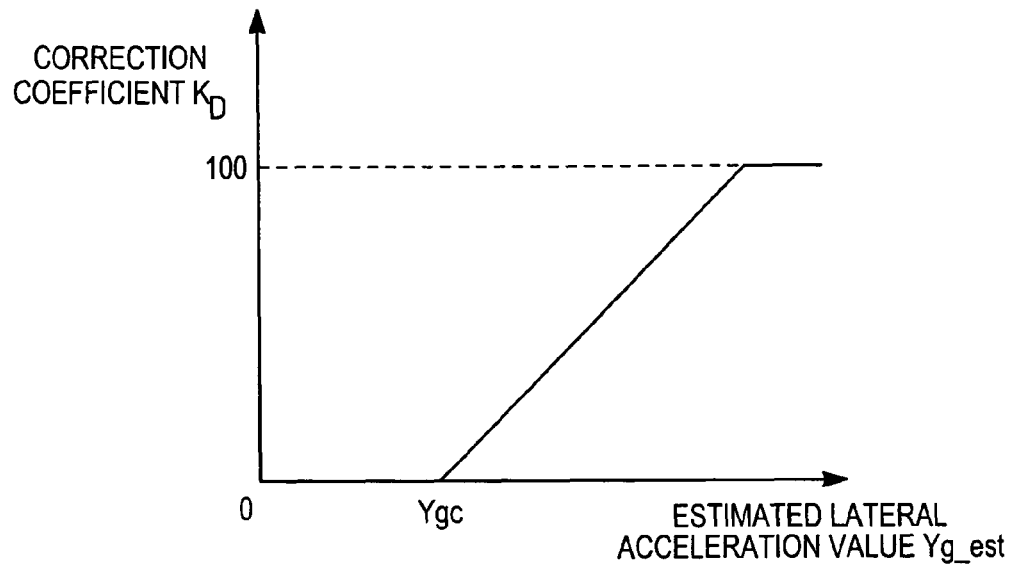
FIG. 21 is a graph illustrating the relationship between a predicted lateral acceleration value Yg_est and a correction coefficient $K_D$.
Figure 22:
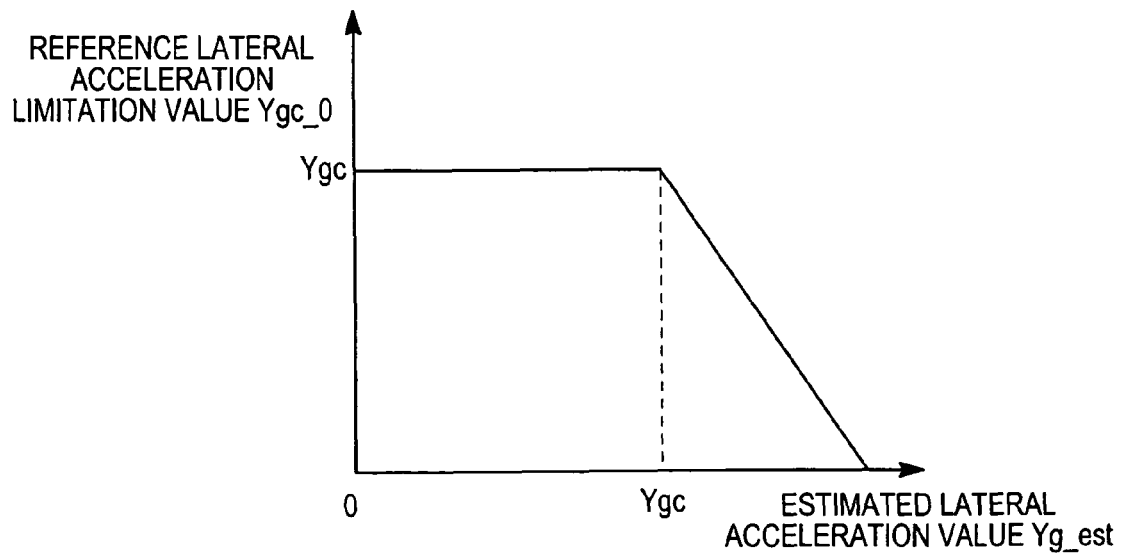
FIG. 22 is a graph illustrating the relationship between a predicted lateral acceleration value Yg_est and a reference lateral acceleration limitation value Ygc_0.

As shown in FIG. 21, correction coefficient $K_D$ is increased as computed estimated lateral acceleration value Yg_est increases. Correction coefficient $K_D$ is set at a fixed value when estimated lateral acceleration value Yg_est is higher than a certain value. When correction coefficient $K_D$ is set based on estimated lateral acceleration value Yg_est, the reference lateral acceleration limitation value Ygc_0 is set at a lower value as correction coefficient $K_D$ increases. Referring to FIG. 22, as estimated lateral acceleration value Yg_est decreases, reference lateral acceleration limitation value Ygc_0 is set at a higher value provided that reference lateral acceleration limitation value Ygc is the upper limit. Because reference lateral acceleration limitation value Ygc_0 decreases as estimated lateral acceleration value Yg_est increases, the deceleration control intervention timing is set forward.

Figure 23:
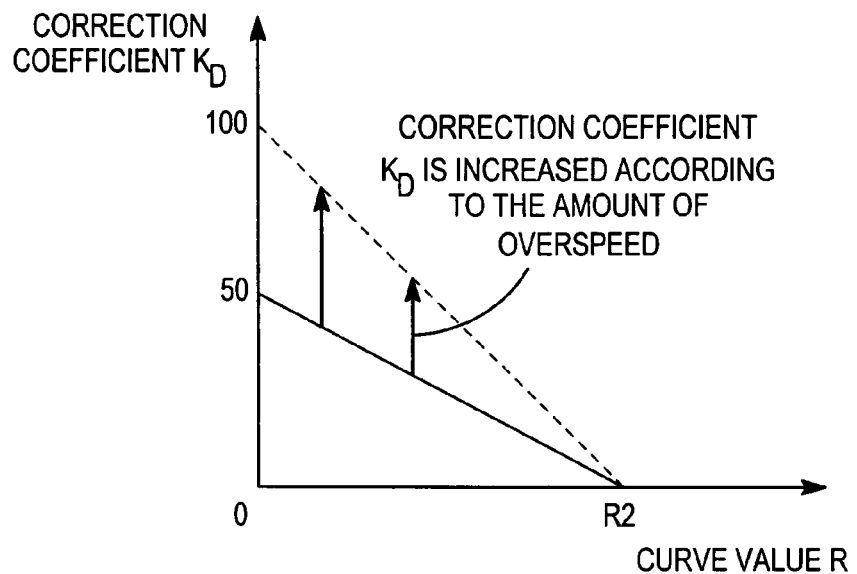
FIG. 23 is a graph illustrating a first application example of the relationship among value R, an overspeed amount, and a correction coefficient $K_D$.
Figure 24:
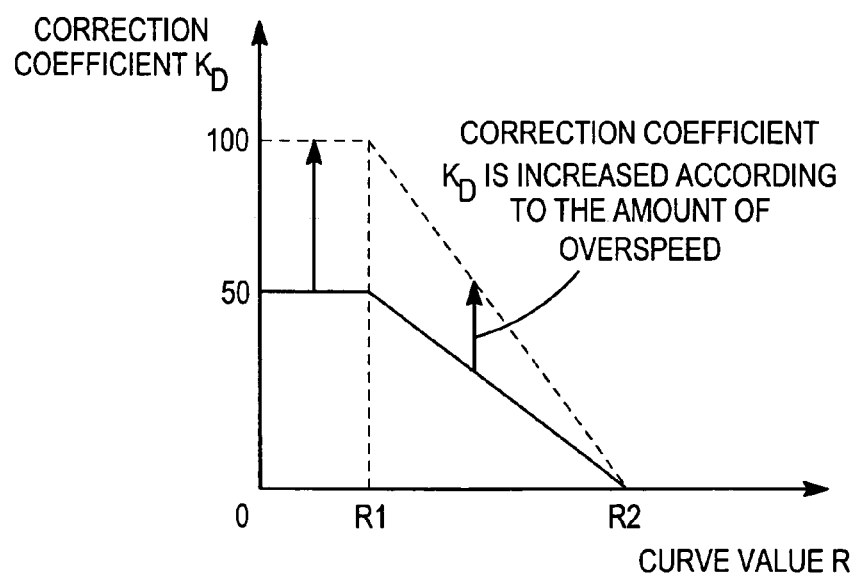
FIG. 24 is a graph illustrating a second application example of the relationship among value R, an overspeed amount, and a correction coefficient $K_D$.
Figure 25:
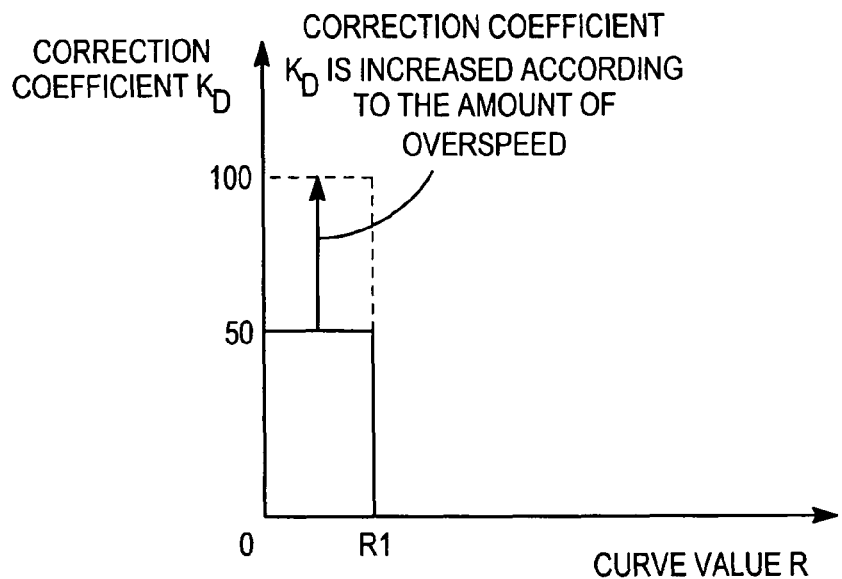
FIG. 25 is a graph illustrating a third application example of the relationship among value R, an overspeed amount, and a correction coefficient $K_D$.

Correction coefficient $K_D$ may be set based on value R and the amount of overspeed. For example, as shown in FIG. 23 through FIG. 25, correction coefficient $K_D$ is set to a higher value as value R decreases, and correction coefficient $K_D$ is set at a higher value as the amount of overspeed increases while using the amount of overspeed as a parameter. When value R is high (provided that value R is lower than R2), and the amount of overspeed is large, the correction coefficient $K_D$ can be set at a corresponding high value. Even if value R is low, if the amount of overspeed is large the correction coefficient $K_D$ can be set at a high value.

The higher of correction coefficient $K_D$ obtained based on value R and correction coefficient $K_D$ obtained based on the amount of overspeed may be selected, and the higher value may be set as the final correction coefficient $K_D$.

Figure 26:
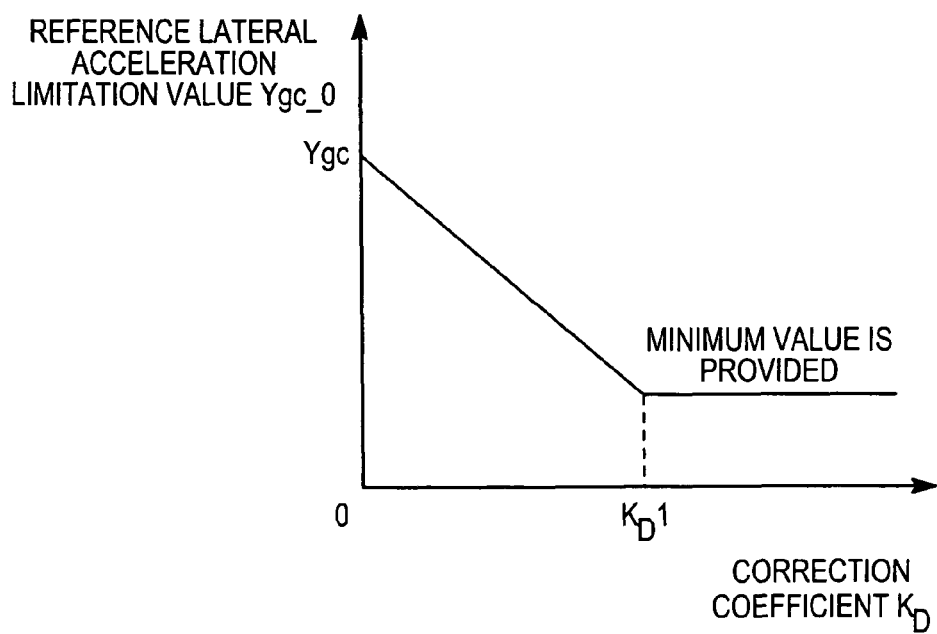
FIG. 26 is a graph illustrating a second application example of the relationship between a correction coefficient $K_D$ and a reference lateral acceleration limitation value Ygc_0.

As illustrated in FIG. 8, a specific relationship between correction coefficient $K_D$ and reference lateral acceleration limitation value Ygc_0 exists according to a first application example. In a second application example shown in FIG. 26, the reference lateral acceleration limitation value Ygc_0 decreases as correction coefficient $K_D$ increases. Reference lateral acceleration limitation value Ygc_0 is set at a fixed value (fixed at a low value) regardless of correction coefficient $K_D$ when correction coefficient $K_D$ is equal to or higher than prescribed value $K_D1$. Therefore, a minimum value is provided for reference lateral acceleration limitation value Ygc_0.

The deceleration control intervention timing is set further forward as reference lateral acceleration limitation value Ygc_0 decreases (refer to Table 1). A minimum value is provided for reference lateral acceleration limitation value Ygc_0 to prevent lateral speed limitation value Yg* from reaching a prescribed minimum value in order to prevent the deceleration control intervention timing from going forward more than necessary, which in turn prevents the creation of a sense of discomfort in the driver during deceleration control.

Figure 27:
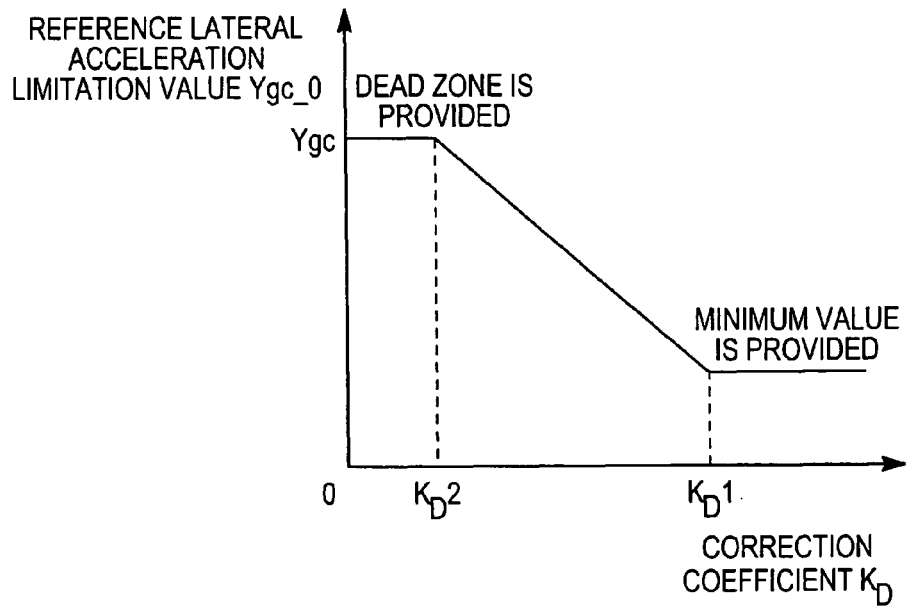
FIG. 27 is a graph illustrating a third application example of the relationship between a correction coefficient $K_D$ and a reference lateral acceleration limitation value Ygc_0.

As shown in FIG. 27, while reference lateral acceleration limitation value Ygc_0 is set at a higher value as correction coefficient $K_D$ decreases, reference lateral acceleration limitation value Ygc_0 is set at a fixed value (e.g., fixed at a high value) regardless of correction coefficient $K_D$ if correction coefficient $K_D$ is equal to or lower than prescribed value $K_D2$. A dead zone where reference lateral acceleration limitation value Ygc_0 does not change in response to correction coefficient $K_D$ is provided. When the dead zone is provided, application of deceleration control can be prevented when deceleration is not needed, such as in an area where value R is high or in an area where the amount of overspeed is small. This is especially effective in an area where value R is high because the computation accuracy of the value R there may be degraded.

Figure 28:
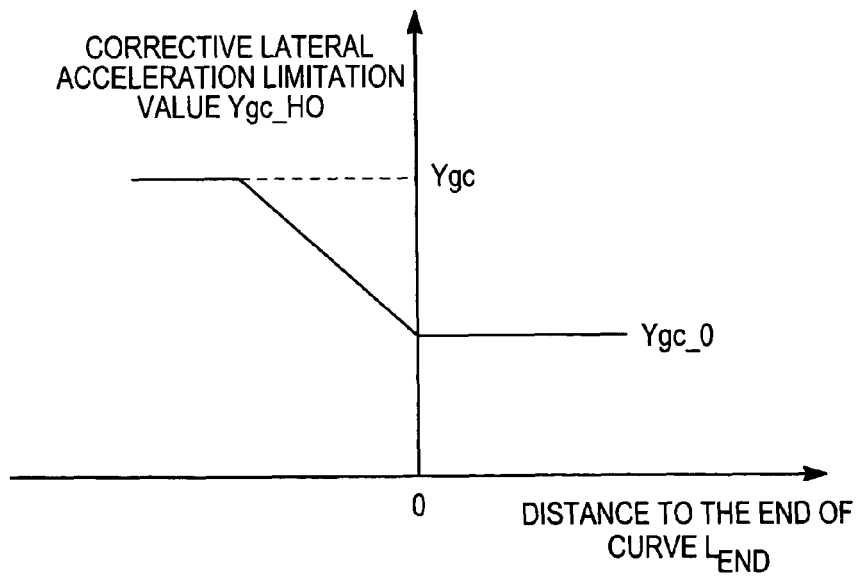
FIG. 28 is a graph illustrating a second application example of the relationship between distance $L_{END}$ to the end of a curve and a corrective lateral acceleration limitation value Ygc_HO.

In the first application example, shown in FIG. 11, a specific setting of corrective lateral acceleration limitation value Ygc_HO is used for ending correction of the lateral acceleration limitation value. In a second application example as shown in FIG. 28, when distance $L_{END}$ to the end of the curve has become a negative value, the corrective lateral acceleration limitation value Ygc_HO is changed from reference lateral acceleration limitation value Ygc_0 toward the prescribed value Ygc at a prescribed slope as the value decreases, that is, according to the distance from the curve after the vehicle has moved beyond the end of the curve. The correction of the lateral acceleration limitation value is canceled gradually after the vehicle has moved beyond the end of the curve. The sense of slowdown that is created in the driver by the deceleration control can be reduced after passing the end of the curve. Furthermore, because correction of the lateral acceleration limitation value is canceled gradually instead of canceling the correction of the lateral acceleration limitation value at once, deceleration control can be maintained under a condition in which it can be applied promptly while reducing the sense of slowdown created in the driver by the deceleration control.

In an example in which corrective lateral acceleration limitation value Ygc_HO is set after the vehicle has passed the end of the curve ($L_{END}<0$), the lateral acceleration limitation value Ygc_HO is calculated by:

$$Ygc\_HO = Ygc\_0 + \Delta Ygc \times \Delta t \qquad (13)$$

where $\Delta Ygc$ indicates a prescribed value, and $\Delta t$ indicates a prescribed time.

The maximum value of corrective lateral acceleration limitation value Ygc_HO computed using equation (12) is equal to the prescribed value Ygc.

Figure 29:
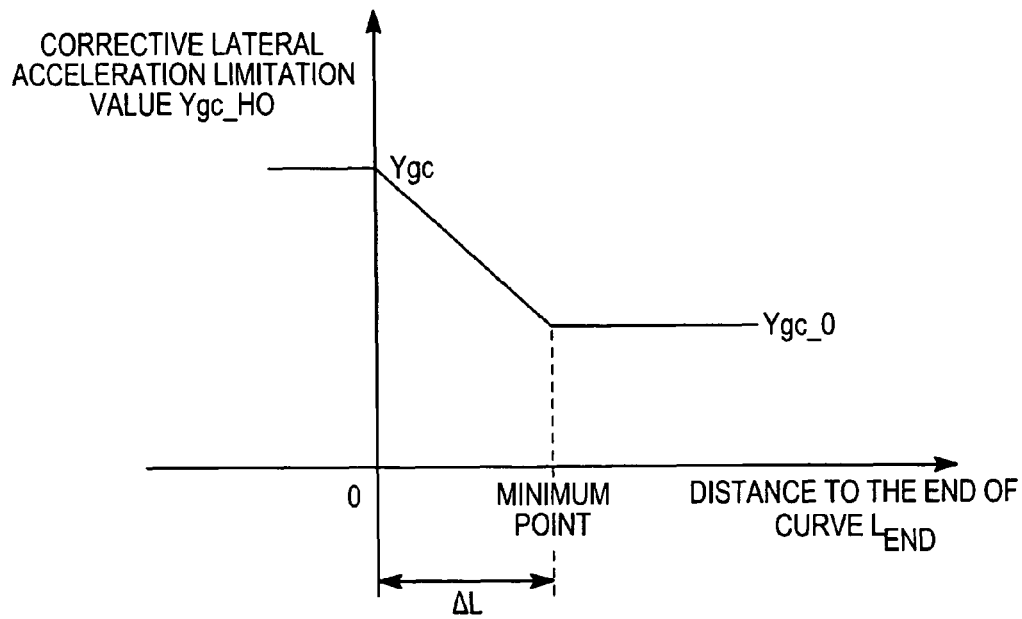
FIG. 29 is a graph illustrating a third application example of the relationship between distance $L_{END}$ to the end of a curve and a corrective lateral acceleration limitation value Ygc_HO.

As shown in FIG. 29, when distance $L_{END}$ to the end of the curve has reached a prescribed value (positive value) or less, that is, when the vehicle has passed minimum value $R_{MIN}$ of value R at the position before the end of the curve by the distance $\Delta L$, the corrective lateral acceleration limitation value Ygc_HO is changed from corrective lateral acceleration limitation value Ygc_0 toward the prescribed value Ygc according to the distance to the end of the curve. After the point corresponding to minimum value $R_{MIN}$ of value R is passed, the correction of lateral acceleration limitation value Yg* is canceled gradually according to the distance between the point and the vehicle. Because corrective lateral acceleration limitation value Ygc_0 or lateral acceleration limitation value Yg* begins to increase before the end of the curve, cancellation of deceleration control becomes easier so that creation of a sense of drag in the driver can be prevented during deceleration control.

Figure 30:
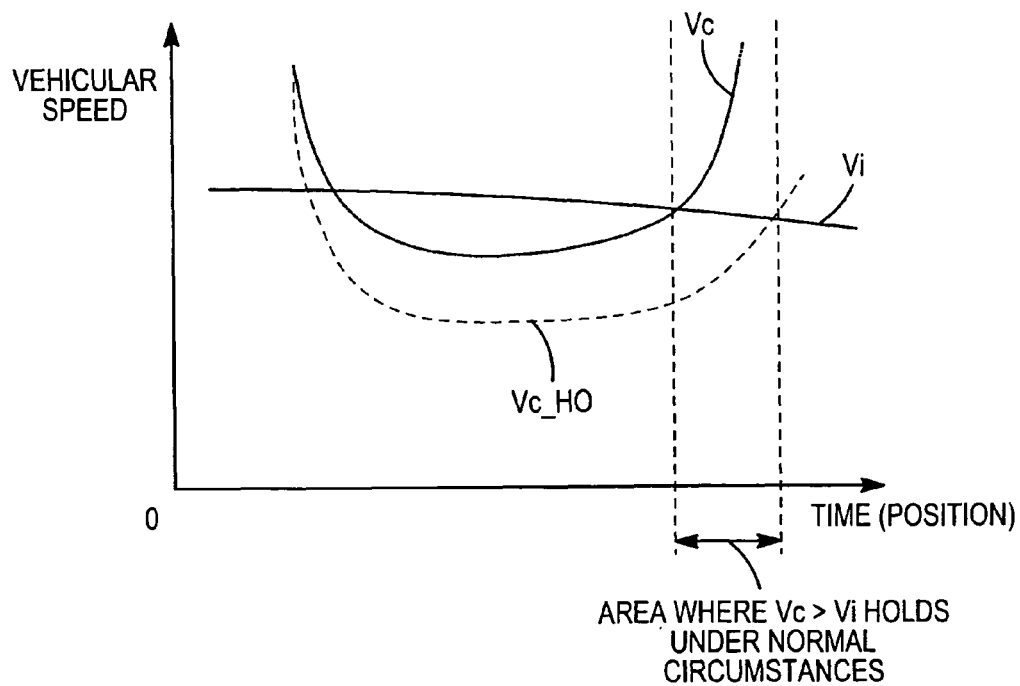
FIG. 30 is a diagram illustrating the cancellation of a correction made to a lateral acceleration limitation value Yg* in response to an accelerator operation performed by a driver of the vehicle.

A revision of lateral acceleration limitation value Yg* based on correction coefficient $K_D$ may be canceled when a driving operation is performed by the driver. For example, as shown in FIG. 30, the target vehicular speed V* (=Vc), which is computed by setting corrective lateral acceleration limitation value Ygc_HO at prescribed value Ygc, is faster, and the target vehicular speed V* (=Vc_HO) computed using corrective lateral acceleration limitation value Ygc_HO (Ygc>Ygc_HO≧Ygc_0), which is computed based on correction coefficient $K_D$, is slower than the actual vehicular speed Vi (V). The reference lateral acceleration limitation value Ygc is not corrected based on correction coefficient $K_D$ although deceleration control is actually applied (Vi>Vc_HO, $\Delta V<0$). The result is that the target vehicular speed is greater than the actually vehicular speed, Vc>Vi (Xg*<0). When the driver operates the accelerator, accelerating the vehicle, and deceleration control is not applied (the area sandwiched by the dotted lines in FIG. 30), correction of lateral speed limitation value Yg* based on correction coefficient $K_D$ is canceled. This occurs, for example, at the end of the curve.

Figure 31:
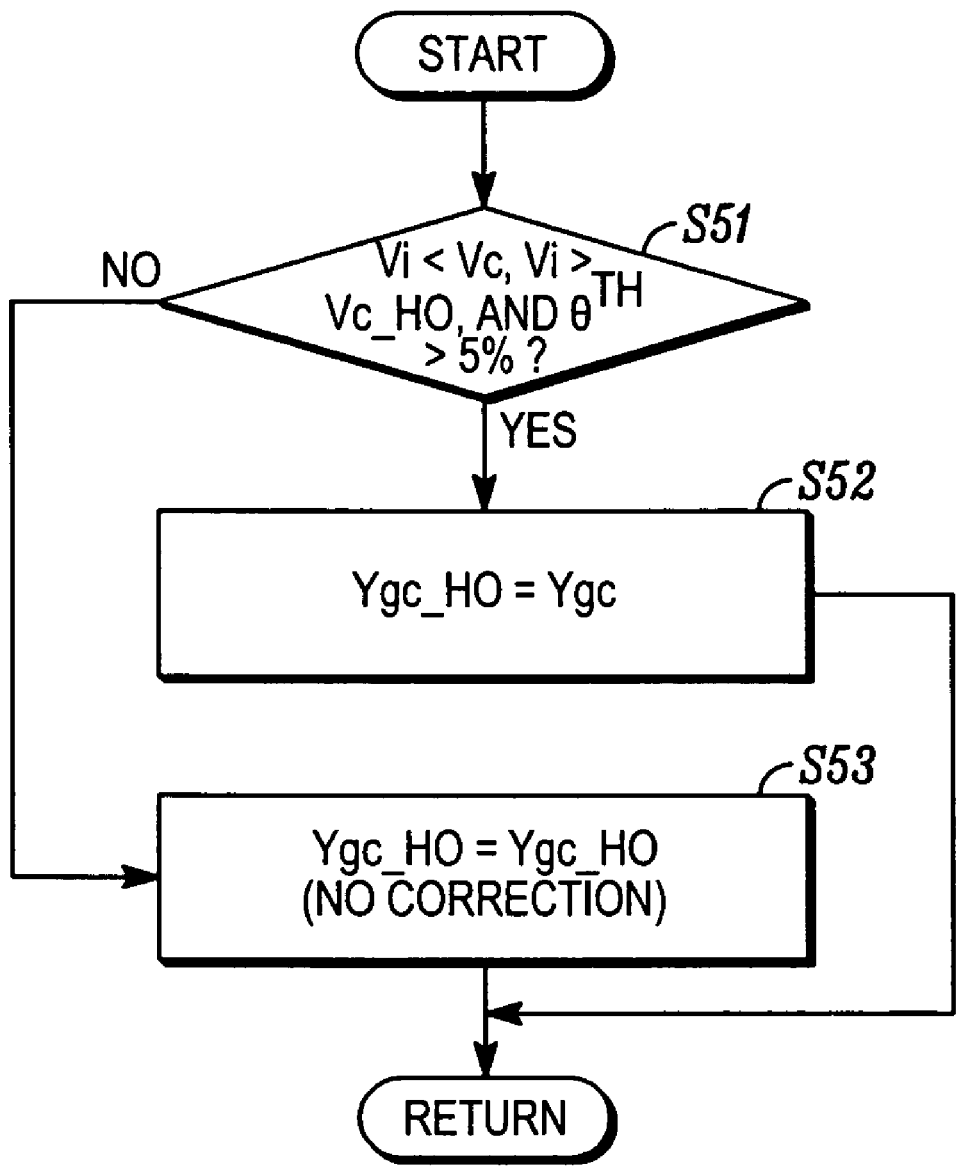
FIG. 31 is a flow chart illustrating the process of canceling a correction made to the lateral acceleration limitation value Yg* based on the correction coefficient $K_D$ in response to an accelerator operation performed by a driver on the vehicle.

FIG. 31 shows processing for canceling the correction of lateral speed limitation value Yg* based on correction coefficient $K_D$. First, in S51 it is determined whether the current vehicular speed Vi is slower than the target vehicular speed Vc, whether the current vehicular speed Vi is faster than the target vehicular speed Vc_HO, and whether the accelerator opening angle $\theta_{th}$ is greater than 5%. Processing advances to S52 when the conditions are met (Vc>Vi>Vc_HO and $\theta_{th}>5\%$), or advances to S53 when the conditions are not met.

In S52 corrective lateral acceleration limitation value Ygc_HO is set at reference lateral acceleration limitation value Ygc (Ygc_HO=Ygc), and correction of lateral acceleration limitation value Yg* based on correction coefficient $K_D$ is canceled. In addition, in S53 corrective lateral acceleration limitation value Ygc_HO is maintained without canceling the correction of corrective lateral acceleration limitation value Ygc_HO (Ygc_HO=Ygc_HO).

When the accelerator is operated by the driver while deceleration control is in progress, the correction of lateral acceleration limitation value Yg based on correction coefficient $K_D$ is canceled, and deceleration control can be applied in conformity with the intent of the driver. For example, even if deceleration control is applied unnecessarily due to a drop in the detection accuracy of the road shape, that is, value R, deceleration control is canceled when the driver accelerates, so that creation of a sense of discomfort in the driver by the deceleration control can be prevented.

Furthermore, although correction coefficient $K_D$ is obtained using value R of the curve in the first application embodiment, the corrective lateral acceleration limitation value may be set at a prescribed value (for example, 0.35 G) during the period between the start and the end of the curve without using curve value R.

Although according to embodiments described above the information about the curve ahead is detected in advance so as to correct the lateral acceleration limitation value to be used when the vehicle is traveling along the curve (S1 in FIG. 3), whether the road shape at the current traveling position indicates a curve may be detected in real-time in order to correct the lateral acceleration limitation value at the current position based on the result of the detection.

According to embodiments as described above, deceleration control is facilitated when traveling along a curve by correcting the lateral acceleration limitation value. However, the application of deceleration control may be facilitated when traveling along a curve by correcting the target vehicular speed and the deceleration control timing based on correction coefficient $K_D$ in S22 and S23 in FIG. 6.

According to embodiments of the invention for controlling deceleration of a vehicle described above, the target vehicular speed computation part 22 of deceleration controller 10 is used to realize a target vehicular speed setting means that sets the target vehicular speed based on the turning condition of the vehicle and a preset lateral acceleration limitation value, the wheel speed sensors 13FL through 13RR are used to realize a speed detection means, the navigation unit 4 is used to realize a curve detection means that detects information on the curve along which the vehicle travels, and the corrective lateral acceleration limitation value computation part 25 is used to realize a lateral acceleration limitation value computation means that makes a correction so as to reduce the lateral acceleration limitation value when the vehicle is traveling along the curve.

Also, the above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A deceleration control apparatus for a vehicle, the apparatus comprising:
    a speed sensor for detecting an actual vehicular speed;
    a detection device operable to detect a start of a curve in a path of the vehicle; and
    a controller operable to:
        compute a lateral acceleration limitation value as the vehicle enters the curve based on the distance of the vehicle from the start of the curve, wherein the lateral acceleration limitation value decreases from a maximum prescribed lateral acceleration value in advance of the curve to a reference lateral acceleration value at the start of the curve, wherein the reference lateral acceleration is based on the radius of the curve and is smaller than the prescribed lateral acceleration value;
        set a target vehicular speed calculated based on the lateral acceleration limitation value and a yaw rate of the vehicle, wherein the target vehicular speed decreases as the lateral acceleration limitation value decreases, and the target vehicular speed decreases as the yaw rate of the vehicle increases; and
        apply deceleration to the vehicle if the actual vehicular speed exceeds the target vehicular speed.

2. The deceleration control apparatus according to claim 1 wherein the controller is further operable to:
    reduce the reference lateral acceleration value as the radius of the curve decreases; and
    increase the reference lateral acceleration value as the radius of the curve increases.

3. The deceleration control apparatus according to claim 1 wherein the controller is further operable to:
    reduce the reference lateral acceleration value as a difference between a preset vehicle speed and the actual vehicular speed prior to entry of the vehicle into the curve, the preset vehicle speed based on the radius of the curve.

4. The deceleration control apparatus according to claim 1 wherein the controller is further operable to:
    compute the lateral acceleration limitation value as the vehicle exits the curve based on the distance of the vehicle from the end of the curve, wherein the lateral acceleration limitation value increases from the reference lateral acceleration value in advance of the end of the curve to the prescribed lateral acceleration value at the end of the curve.

5. The deceleration control apparatus according to claim 1 wherein the controller is further operable to:
    compute the lateral acceleration limitation value by increasing the lateral acceleration limitation value from the reference lateral acceleration value to the prescribed lateral acceleration value as the vehicle approaches an exit of the curve, after the vehicle has passed a point where the radius of the curve is at a minimum value.

6. The deceleration control apparatus according to claim 1 wherein the controller is further operable to:
    detect an acceleration operation; and
    override the computation of the lateral acceleration limitation value by setting the lateral acceleration limitation value equal to the prescribed lateral acceleration value when the accelerator operation is detected.

7. The deceleration control apparatus according to claim 1 wherein the controller is further operable to:
    override the computation of the lateral acceleration limitation value by setting the lateral acceleration limitation value equal to the prescribed lateral acceleration value when a turning direction of the curve is opposite a steering direction.

8. The deceleration control apparatus according to claim 1 wherein the controller is further operable to:
    override the computation of the lateral acceleration limitation value by setting the lateral acceleration limitation value equal to the prescribed lateral acceleration value when the radius of the curve is greater than a prescribed upper limit value.

9. A deceleration control apparatus for a vehicle, the apparatus comprising:
    means for detecting an actual vehicular speed;
    means for detecting a start of a curve in a path of the vehicle;
    means for computing a lateral acceleration limitation value that decreases from a maximum prescribed lateral acceleration value to a reference lateral acceleration value based on a distance of the vehicle from the start of the curve, wherein the reference lateral acceleration value is based upon the radius of the curve;
    means for setting a target vehicular speed calculated based on a yaw rate of the vehicle and the lateral acceleration limitation value, wherein the target vehicular speed decreases as the lateral acceleration limitation value decreases, and the target vehicular speed decreases as the yaw rate of the vehicle increases; and
    means for applying deceleration to the vehicle based on the actual vehicular speed and the target vehicular speed.

10. A method for controlling deceleration of a vehicle, comprising:
    detecting a start of a curve in a path of the vehicle;
    computing a lateral acceleration limitation value as the vehicle enters the curve based on the distance of the vehicle from the start of the curve, wherein the lateral acceleration limitation value decreases from a maximum prescribed lateral acceleration value in advance of the curve to a reference lateral acceleration value at the start of the curve, and the reference lateral acceleration value is based upon the radius of the curve;
    setting a target vehicular speed based on a yaw rate of the vehicle and the lateral acceleration limitation value; and
    applying deceleration control to the vehicle if an actual speed of the vehicle is greater than the target vehicular speed.

11. The method for controlling deceleration according to claim 10, further comprising:
    detecting an acceleration operation;
    overriding the computation of the lateral acceleration limitation value by setting the lateral acceleration limitation value equal to the prescribed lateral acceleration value when the accelerator operation is detected.

12. The method for controlling deceleration according to claim 10, further comprising:
    detecting a radius of the curve; and
    correcting the deceleration control by reducing the reference lateral acceleration value as the radius of the curve decreases.

13. The method for controlling deceleration according to claim 10, further comprising:
    computing a preset vehicle speed based on a radius of the curve; and
    computing the reference lateral acceleration value based additionally on a difference between the preset vehicle speed and an actual speed of the vehicle prior to entry of the vehicle into the curve.

14. The deceleration control apparatus according to claim 1 wherein the controller is further operable to set the target vehicle speed at prescribed intervals.

15. The deceleration control apparatus according to claim 1 wherein the controller is further operable to set the target vehicular speed to reflect changes in the yaw rate as the vehicle travels along the curve.

* * * * *